(12) United States Patent
Sugiura et al.

(10) Patent No.: US 6,734,929 B2
(45) Date of Patent: May 11, 2004

(54) ILLUMINATION DEVICE HAVING A SINGLE LIGHT SOURCE AND LIQUID CRYSTAL DISPLAY DEVICE

(75) Inventors: Takuro Sugiura, Fukushima-ken (JP); Ohizumi Mitsuo, Fukushima-ken (JP); Tatsumaro Yamashita, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/358,108

(22) Filed: Feb. 4, 2003

(65) Prior Publication Data
US 2003/0174261 A1 Sep. 18, 2003

(30) Foreign Application Priority Data

Feb. 5, 2002 (JP) ........................ 2002-028230

(51) Int. Cl.⁷ ..................... G02F 1/1335; F21V 7/04
(52) U.S. Cl. ................................. 349/65; 362/31
(58) Field of Search ....................... 349/61, 65; 362/31, 362/244, 561, 555

(56) References Cited

U.S. PATENT DOCUMENTS 6,104,453 A    8/2000   Watanabe 6,629,764 B1 * 10/2003 Uehara ..................... 362/31

FOREIGN PATENT DOCUMENTS

| EP | 0 621 500 A1 | 10/1994 |
| EP | 0 823 587 A1 | 2/1998 |
| EP | 0 879 991 A2 | 11/1998 |
| EP | 0 879 991 A3 | 4/1999 |
| EP | 1 279 891 A1 | 1/2003 |
| WO | WO 99/22268 | 5/1999 |

* cited by examiner

Primary Examiner—Tarifur R. Chowdhury
Assistant Examiner—Tai Duong
(74) Attorney, Agent, or Firm—Brinks Hofer Gilson & Lione

(57) ABSTRACT

One major surface of a light guide plate is formed, in stripe form in a plan view, with a plurality of prism grooves each consisting of a slight slope and a steep slope. The inclination angles of the slight slope and the steep slope are in ranges of 1° to 10° and 41° to 45°, respectively. The width of the steep slope in the one major surface of the light guide plate increases as the position increases from a light incident surface of the light guide plate such that a ratio of the width of the steep slope at a position farthest from the light incident surface to the width of the steep slope at a position closest to the light incident surface is 1.1 to 1.5.

20 Claims, 12 Drawing Sheets

ILLUMINATION DEVICE HAVING A SINGLE LIGHT SOURCE AND LIQUID CRYSTAL DISPLAY DEVICE

BACKGROUND OF THE INVENTION

1. Field of the Invention

The present invention relates to an illumination device and a liquid crystal display device. In particular, the invention relates to an illumination device which can illuminate a wide area brightly and uniformly though having only a single light source as well as to a liquid crystal display device using it.

2. Description of the Related Art

Conventionally, front lights of reflection-type liquid crystal display devices employ a unit that is composed of a light source, an intermediate light guide, a light guide plate, a case body that holds those components in an integral manner and has an inner reflective surface, and other components.

FIG. 23A is a perspective view showing the configuration of a liquid crystal display device having such a configuration. FIG. 23B is a plan view of the liquid crystal display device of FIG. 23A. The liquid crystal display device shown in FIGS. 23A and 23B is composed of a liquid crystal display unit 120 and a front light 110 that is disposed on the front side of the liquid crystal display unit 120. Although not shown in detail, the liquid crystal display unit 120 is a reflection-type liquid crystal display unit that performs display by reflecting light coming from the front side. In the liquid crystal display unit 120, a liquid crystal layer is held between a top substrate 121 and a bottom substrate 122 that are opposed to each other. Display is performed by varying the light transmission state by controlling the liquid crystal orientation state of the liquid crystal layer.

The front light 110 is composed of a flat light guide plate 112, a rod-shaped intermediate light guide 113 that is disposed to a side end face 112a of the flat light guide plate, and a light-emitting element 115 that is disposed adjacent to one end face of the intermediate light guide 113. The top surface of the light guide plate 112 is formed with a prism structure in which a plurality of wedge-shaped (in cross-section) projections 114 are arranged parallel with each other. To prevent a moiré pattern, the projections 114 are formed so as to be somewhat inclined with respect to a light-guide-plate-side end face 112a.

In the front light 110, light that is emitted from the light-emitting element 115 is applied to the side end face 112a of the light guide plate 112 via the intermediate light guide 113 and is thereby introduced into the light guide plate 112. The light is reflected by the prism-shaped top surface of the light guide plate 112 and is thereby changed in traveling direction. As a result, the light is emitted from the bottom surface (see FIG. 23A) of the light guide plate 112 toward the liquid crystal display unit 120.

In portable electronic equipment such as PDAs and portable game machines, the battery drive time greatly influences the ease of use. Therefore, liquid crystal display devices that are used as display sections of such equipment have come to employ, to lower the power consumption of a front light, a single-light front light that is equipped with only a single light-emitting element like the front light 110 shown in FIG. 23A is. That is, it is intended to reduce the power consumption by decreasing the number of light-emitting elements. Further, miniaturization of portable electronic equipment requires that the thickness of the front light 110 be decreased to about 1 mm.

However, in such single-light front lights, it is almost impossible to uniformly illuminate a wide display screen of several inches or more with the combination of the thin light guide plate and the single light-emitting element. More specifically, in the front light 110 shown in FIG. 23A in which the light-emitting element 115 is provided on one side, to uniformly introduce light coming from the light-emitting element 115 into the light guide plate 115, first it is necessary to make the incident light uniform in the longitudinal direction of the side end face 112a of the light guide plate 112 by means of the intermediate light guide 113. However, since making the incident light on the light guide plate 112 uniform by means of the intermediate light guide 113 is difficult in itself, it is very difficult to obtain output light that is uniform over the entire light exit surface of the light guide plate 112. In a serious case, this results in a problem that, as shown in FIG. 23B, a triangular (in a plan view) dark portion 118 may occur close to the light-emitting-element-115-side sideline (left-hand-sideline in FIG. 23B) of the light guide plate 112, which lowers the legibility of the liquid crystal display device.

Where the light guide plate 112 is made thinner to reduce the thickness and size of portable electronic equipment, light traveling inside the light guide plate 112 is prone to leak out of the light guide plate 112 in being reflected by the surfaces of the light guide plate 112. This results in a problem that the light quantity decreases as the position goes away from the light-emitting element 115.

As described above, whereas the demand for the front light using a single light-emitting element as a light source is increasing, no front light has been realized which can illuminate a large area brightly and uniformly though it is thin.

SUMMARY OF THE INVENTION

The present invention has been made to solve the above problems, and one object of the invention is therefore to provide an illumination device which can illuminate a large area brightly and uniformly though its power consumption is low.

Another object of the invention is to provide a liquid crystal display device that is equipped with such an illumination device and is high in luminance and superior in display quality.

To attain the above objects, the invention employ the following configurations.

The invention provides an illumination device comprising a light source, and a light guide plate for receiving light emitted from the light source through one side end face thereof, and for outputting the light traveling inside the light guide plate through one major surface thereof as a light exit surface, the other major surface, being a light reflecting surface, of the light guide plate being formed, in stripe form in a plan view, with a plurality of prism grooves each of which is formed by a slight slope and a steep slope having an inclination angle larger than that of the slight slope, the inclination angle θ1 of the slight slope and the inclination angle θ2 of the steep slope being in ranges of 1° to 10° and 41° to 45°, respectively, the width of the steep slope in the reflecting surface increasing as the steep slope goes away from the light incident surface in such a manner that the width of the steep slope amounts to 1.1 to 1.5 at a position farthest from the light incident surface if it is assumed that the width of the steep slope is equal to 1.0 at a position closest to the light incident surface.

According to the above configuration, since the shapes and the dimensions of the prism grooves which are formed in the reflecting surface of the light guide plate are set within the above ranges, a high-luminance illumination device can be obtained in which the exit light quantity is uniform in the light exit surface of the light guide plate and the efficiency of utilization of the light source is high. If the inclination angle θ1 of the slight slope is smaller than 1°, the desired amount of luminance for the illumination device is not obtained. If it is larger than 10°, the uniformity of the quantity of exit light that is output from the light exit surface of the light guide plate lowers. Therefore, such ranges of the inclination angle θ1 are not preferable. If the inclination angle θ2 of the steep slope is smaller than 41° or larger than 45°, the luminance of the illumination device lowers. Therefore, such ranges of the inclination angle θ2 are not preferable.

The width of the steep slope is measured in the direction perpendicular to the extending direction of the prism grooves. The proportion of light that is reflected by the prism groove to go down increases as the width of the steep slope increases. Therefore, in the illumination device having the above configuration, the width of the steep slope is set at a proper value in accordance with the distance from the light incident surface of the light guide plate. More specifically, in a region that is close to the light incident surface where the quantity of light traveling inside the light guide plate is relatively large, the width of the steep slope is made relatively small, whereby the proportion of light that is reflected to go down is decreased. Conversely, in a region that is distant from the light incident surface, the width of the steep slope is made large, whereby the proportion of light that is reflected to go down is increased. In this manner, the distribution of the exit light quantity is made uniform over the entire light guide plate. In the invention, the width of the steep slope amounts to 1.1 to 1.5 at a position farthest from the light incident surface if it is assumed that the width of the steep slope is equal to 1.0 at a position closest to the light incident surface, whereby the distribution of the exit light quantity is made uniform. As will be described later in the examples, the present inventors have confirmed that the above setting ranges of the inclination angles of the slopes and the width of the steep slope are proper.

The illumination device according to the invention may be such that the width of the steep slope of each of the prism grooves is approximately constant in the prism groove extending direction, and that the width of the steep slope increases as the prism groove average distance from the light incident surface increases.

More specifically, in the illumination device according to the invention, the prism grooves are formed in such a manner that the width of the steep slope gradually increases as the steep slope goes away from the light incident surface starting from the steep slope closest to the light incident surface. The width of the steep slope farthest from the light incident surface is 1.1 to 1.5 times the width of the steep slope closest to the light incident surface. With this structure, the proportion of light that is reflected by the steep slope to go down increases as the prism groove goes away from the light incident surface of the light guide plate. As a result, the exit light quantity can be made uniform in the light exit surface of the light guide plate.

The illumination device according to the invention may be such that the extending direction of the prism grooves crosses the light incident surface.

Where an object to be illuminated by the illumination device has periodic shapes or patterns that are arranged at prescribed intervals, this structure prevents occurrence of a moiré pattern due to optical interference between the prism grooves of the light guide plate and the shapes and patterns of the object to be illuminated. For example, where the object to be illuminated is a liquid crystal display unit, optical interference between the prism grooves and a matrix-like pixel arrangement would otherwise cause a problem. The above structure prevents occurrence of such a moiré pattern and provides superior legibility.

The illumination device according to the invention may be such that the width of the steep slope of each of the prism grooves increases continuously in the prism groove extending direction as the position goes away from the light incident surface.

With this structure, in the case where the prism grooves are formed so as to cross the light incident surface, the width of the steep slope can be increased as the position goes away from the light incident surface. Therefore, the proportion of light that is reflected by the steep slope to go down can be increased as the position goes away from the light incident surface of the light guide plate. As a result, the exit light quantity can be made uniform in the light exit surface of the light guide plate.

In the illumination device according to the invention, it is preferable that the inclination angle α of the prism grooves that is formed by the extending direction of the prism grooves and the longitudinal direction of the light incident surface be larger than 0° and smaller than or equal to 15°. It is even more preferable that the inclination angle α of the prism grooves be in a range of 6.5° to 8.5°.

With this structure, the uniformity of the exit light quantity in the light exit surface of the light guide plate can be increased. Further, the optical interference between an object to illuminated and the light guide plate can be suppressed more efficiently. This advantage is greater in the case where the object to illuminated has periodic shapes or patterns that include straight portions parallel with the light incident surface of the light guide plate and whose repetition direction is perpendicular to the light incident surface of the light guide plate.

The above advantage cannot be obtained if the inclination angle α of the prism grooves is equal to 0° or larger than 15°. Setting the inclination angle α of the prism grooves within the range of 6.5° to 8.5° provides an illumination device with a uniform exit light quantity distribution and that is not prone to cause a moiré pattern due to interference with an object to be illuminated.

In the illumination device according to the invention, the light source may comprise an intermediate light guide consisting of two light guide members that extend along the light incident surface of the light guide plate and a side end face of the light guide plate connecting to the light incident surface, respectively, and that are arranged so as to assume an L shape in a plan view, and a light-emitting element that is disposed adjacent to an end face of at least one of the two light guide members.

This structure makes it possible to supply light through two side end faces of the light guide plate. Since more light can be supplied to the light-emitting-element-side end portion of the light guide plate where the exit light quantity is prone to decrease in conventional single-light illumination devices, the uniformity of the exit light quantity in the light exit surface of the light guide plate is improved.

In the illumination device according to the invention, the light source may comprise an intermediate light guide extending along the light incident surface of the light guide plate and a light-emitting element disposed adjacent to an end face of the intermediate light guide, and a metal reflection film may be formed on a side end face of the light guide plate that connects to the light incident surface.

With this structure, since the reflection film is formed on the side end face of the light guide plate that connects to the light incident surface, leakage of light through, in particular, the light-emitting-element-side end face of the light guide plate can be prevented. Since light that is reflected by this reflection film returns to the light guide plate, decrease in exit light quantity in, in particular, the light-emitting-element-side end portion of the light guide plate can be prevented effectively. As a result, a highly uniform distribution of the exit light quantity can be obtained.

In the illumination device according to the invention, the light source may comprise an intermediate light guide extending along the light incident surface of the light guide plate and a light-emitting element disposed adjacent to an end face of the intermediate light guide, and the light guide plate may project, in the longitudinal direction of the light incident surface, from a display region of the light guide plate through which an object to be illuminated by the illumination device is to be transmission-displayed.

In this illumination device, by projecting the light guide plate in the extending direction of the intermediate light guide, the light-emitting-element-side portion of the light guide plate particularly where the exit light quantity is prone to decrease is excluded from the display region. As a result, an illumination device in which the exit light quantity is substantially uniform can be provided. The display region of the illumination device according to the invention is a region of the light guide plate through which an object to be illuminated that is disposed on the back side of the illumination device is transmission-displayed, and that substantially corresponds to the whole area (in a plan view) or a display area of the object to be illuminated.

The illumination device according to the invention may be such that the projection width $\Delta W$ of the light guide plate, the inclination angle $\alpha$ of the prism grooves, and the length L of a side end face of the light guide plate connecting to the light incident surface satisfy a relationship $\Delta W \geq L \times \tan \alpha$.

In this illumination device, since the extension length of the light guide plate is set so as to satisfy the above formula, a dark portion that may occur in the light-emitting-element-side portion of the light guide can reliably be located outside the display region of the light guide plate. Therefore, an illumination device can be provided that is superior in the uniformity of the exit light quantity in the display region.

In the illumination device according to the invention, it is preferable that the outer side face of the intermediate light guide be a prism surface that is formed with a plurality of wedge-shaped (in cross-section) grooves, and that a reflection film be formed on the prism surface.

Light that has entered the intermediate light guide from the light-emitting element is reflected by the prism surface in traveling inside the intermediate light guide, is output from the surface that is opposite to the prism surface, and then enters the light guide plate. With the above structure, the reflection film formed on the prism surface increases the reflectivity of the prism surface and can thereby increase the quantity of light that is reflected toward the light guide plate. As a result, the quantity of light entering the light guide plate is increased, which in turn increases the luminance of the illumination device.

Next, a liquid crystal display device according to the invention comprises any of the illumination devices described above and a liquid crystal display unit that is illuminated by the illumination device.

Provided with the illumination device capable of illuminating a large area uniformly at high luminance, this liquid crystal display device can provide superior display quality having high luminance and a uniform brightness distribution. The brightness uniformity is not lowered though the illumination device has only a single light-emitting element. This makes it possible to provide a liquid crystal display device that is superior in display quality and low in power consumption.

The liquid crystal display device according to the invention may be such that the illumination device is disposed on the front side of the liquid crystal display unit, and that the prism grooves of the light guide plate have a pitch P1 that is in a range of $(\frac{1}{2})P0 < P1 < (\frac{3}{4})P0$, where P0 is a pixel pitch of the liquid crystal display unit.

By setting the pixel pitch P0 of the liquid crystal display unit and the pitch P1 of the prism grooves so that they satisfy the above relationship, optical interference between those periodic structures can be prevented. This prevents deterioration in the legibility of the liquid crystal display device due to a moiré pattern that would otherwise be caused by such interference.

If the pitch P1 of the prism grooves is smaller than $(\frac{1}{2})P0$ or larger than $(\frac{3}{4})P0$, a moiré pattern is prone to occur due to interference between the two structures.

In the liquid crystal display device according to the invention, it is preferable that the angle $\beta$ that is formed by the extending direction of the prism grooves and pixel arrangement direction of the liquid crystal display unit that is parallel with the light incident surface of the light guide plate is larger than 0° and smaller than or equal to 15°. It is even more preferable that the angle $\beta$ is in a range of 6.5° to 8.5°.

The angle $\beta$ is an inclination angle of the prism grooves with respect to the pixel arrangement direction. If the inclination angle $\beta$ is 0°, it is difficult to obtain the effect of preventing a moiré pattern. If the inclination angle $\beta$ is larger than 15°, the display luminance is low and a problem arises that a large dark portion appears in the light guide plate of the illumination device. Setting the inclination angle $\beta$ within the range of 6.5° to 8.5° makes it possible to prevent the optical interference almost completely and thereby realize a liquid crystal display device that is much superior in visibility. The angle $\beta$ that is formed by the prism grooves and the pixel arrangement direction of the liquid crystal display unit is equal to the above-mentioned inclination angle $\alpha$ in the case where the pixel arrangement direction of the liquid crystal display unit is parallel with the light incident surface of the light guide plate of the illumination device.

The liquid crystal display device according to the invention may be such that the liquid crystal display unit comprises a top substrate and a bottom substrate that are opposed to each other, liquid crystal molecules that have positive dielectric anisotropy and are held between the top and bottom substrates, and a reflection layer and color filters that are laid on the inner surface of the bottom substrate, the reflection layer having a reflection characteristic that reflection luminance is approximately constant in a reflection angle range of 10° to 40° with respect to the normal to a display surface of the liquid crystal display unit.

This structure enables a display in which the luminance is constant in a wide view angle range, and hence makes it possible to realize a liquid crystal display device that can be used comfortably.

In the liquid crystal display device according to the invention, the reflection layer may have a reflection characteristic that a reflection luminance curve is approximately symmetrical with respect to a specular reflection angle of incident light. This structure makes it possible to provide a liquid crystal display device in which reflection light is diffused in a prescribed angle range with respect to a specular reflection angle of incident light.

In the liquid crystal display device according to the invention, the reflection layer may have a reflection characteristic that a reflection luminance curve is not symmetrical with respect to a specular reflection angle of incident light. This structure can increase luminance of reflection light (display light) in a prescribed direction. Even where, for example, the liquid crystal display device is used in a state that a user is not in the specular reflection direction of the liquid crystal display device, sufficient luminance can be secured in the direction of the user. A liquid crystal display device can be obtained that can be used more comfortably.

In the liquid crystal display device according to the invention, the liquid crystal display unit may be an active matrix liquid crystal display unit or a passive matrix liquid crystal display unit. In either liquid crystal display device, since the illumination device according to the invention is disposed on the front side of the liquid crystal display unit, a high-quality display can be obtained that has a uniform brightness distribution over the entire display area and is free of a moiré pattern.

DESCRIPTION OF THE PREFERRED EMBODIMENTS

Embodiments of the present invention will be hereinafter described with reference to the drawings.
First Embodiment
[Entire Configuration of Liquid Crystal Display Device]

Figure 1:
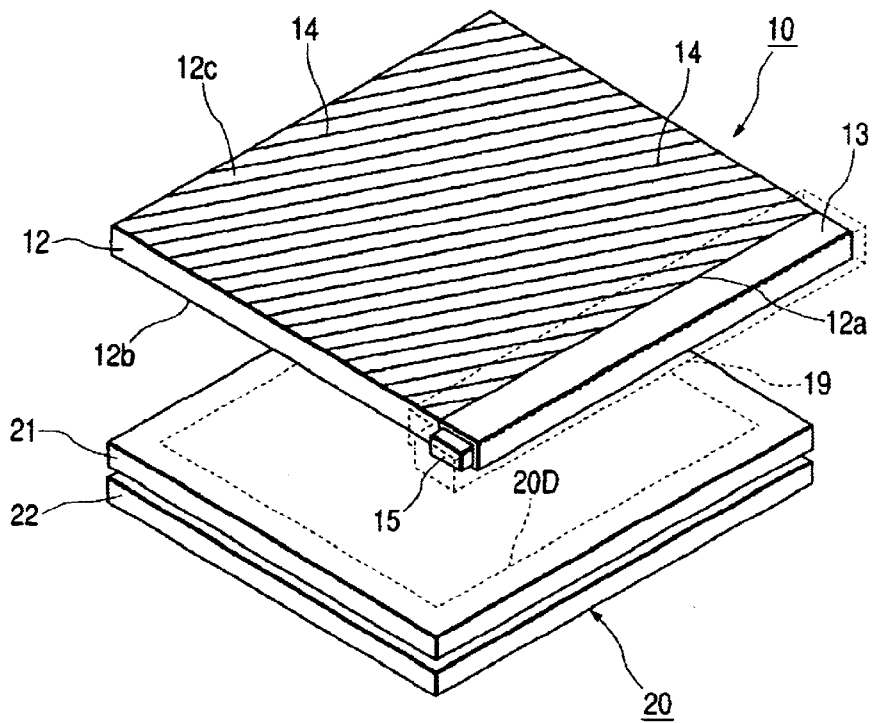
FIG. 1 is a perspective view showing the configuration of a liquid crystal display device according to a first embodiment of the present invention.
Figure 2:
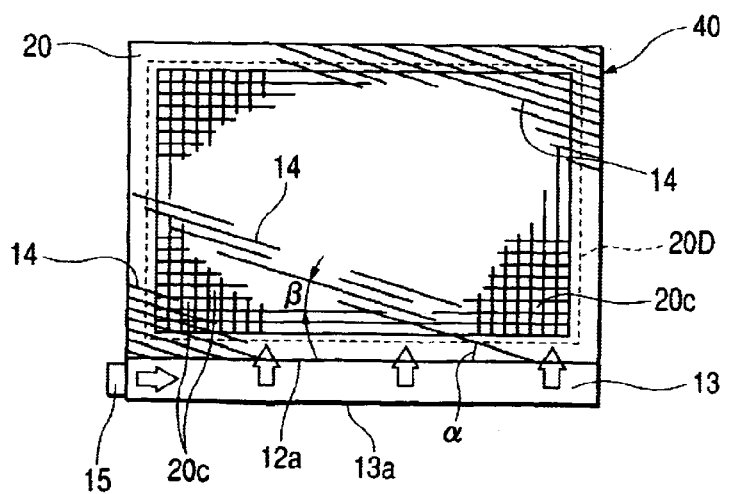
FIGS. 2 and 3 are a plan view and a sectional view, respectively, of the liquid crystal display device of FIG. 1.
Figure 3:
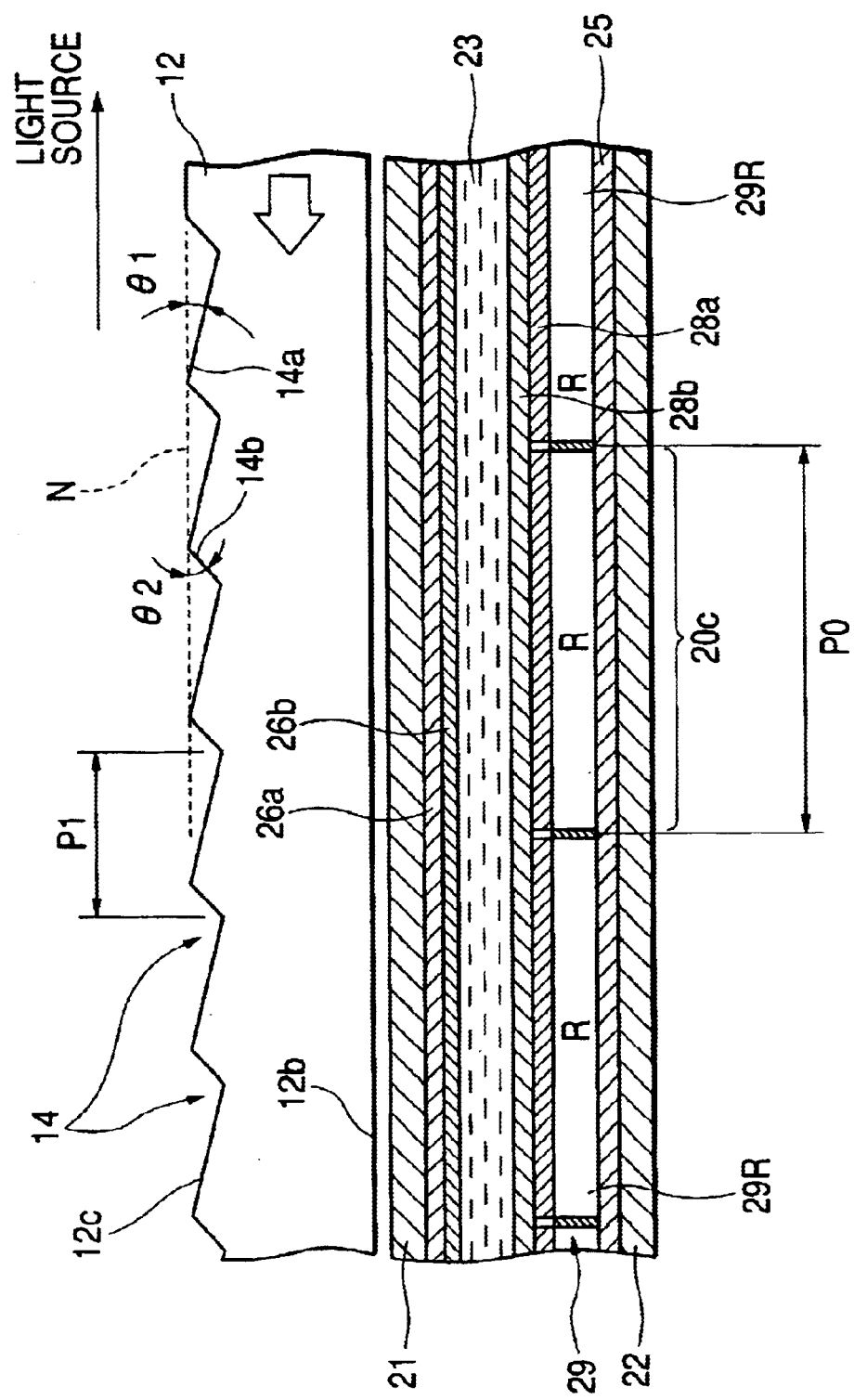

FIG. 1 is a perspective view showing the configuration of a liquid crystal display device according to a first embodiment of the invention. FIGS. 2 and 3 are a plan view and a sectional view, respectively, of the liquid crystal display device of FIG. 1. As shown in FIGS. 1–3, the liquid crystal display device according to this embodiment is composed of a front light (illumination device) 10 and a reflection-type liquid crystal display unit 20 that is disposed on the back side (bottom side in FIG. 1) of the front light 10.

As shown in FIG. 1, the front light 10 is composed of a generally flat, transparent light guide plate 12, an intermediate light guide 13 that is disposed along a side end face 12a of the light guide plate 12, a light-emitting element 15 that is disposed one end face of the intermediate light guide 13, and a case body (light shield body) 19 that is attached from the side of the intermediate light guide 13 so as to cover the intermediate light guide 13, the light-emitting element 15, and a side end portion of the light guide plate 12. That is, in the front light 10 according to this embodiment, the light-emitting element 15 and the intermediate light guide 13 serve as a light source and the side end face 12a of the light guide plate 12 serves as a light incident surface of the light guide plate 12. As shown in FIG. 2, the outer surface (top surface in FIG. 1) of the light guide plate 12 is formed with an array of a plurality of prism grooves 14 that are inclined by an angle α with respect to the light incident surface 12a along which the intermediate light guide 13 is disposed.

The liquid crystal display unit 20 is provided with a top substrate 21 and a bottom substrate 22 that are opposed to each other. A rectangular area 20D that is indicated by a broken line in FIG. 1 is a display area of the liquid crystal display unit 20. As shown in FIG. 2, pixels 20c are formed in matrix form in the display area 20D.

In the liquid crystal display device having the above configuration, the light guide plate 12 is disposed over the display area 20D of the liquid crystal display unit 20. A display on the liquid crystal display unit 20 can be seen through the light guide plate 12. In a dark place where external tight cannot be obtained, the light-emitting element 15 is turned on. Light emitted from the light-emitting element 15 is guided by the intermediate light guide 13 and introduced into the light guide plate 12 through its light incident surface 12a. The light is emitted from the bottom surface 12b (see FIG. 1) of the light guide plate 12 toward the liquid crystal display unit 20 to illuminate the liquid crystal display unit 20.

Next, the structures of the individual components of the liquid crystal display device according to this embodiment will be described in detail with reference to the drawings.

[Front Light]

The light guide plate 12 of the front light 10 is a flat-plate-like member made of a transparent acrylic resin, for example, that is disposed over the display area 20D of the liquid crystal display unit 20 and applies, to the liquid crystal display unit 20, light that is emitted from the light-emitting element 15. As shown in the partial sectional view of FIG. 3, the top surface (i.e., the surface on the side opposite to the liquid crystal display unit 20) of the light guide plate 12 is a reflecting surface 12c in which wedge-shaped (in cross section) prism grooves 14 are arranged parallel with each other and extend in stripe form (in a plan view). The bottom surface (i.e., the surface that is opposed to the liquid crystal display unit 20) of the light guide plate 12 is the light exit surface 12b from which illumination light for illuminating the liquid crystal display unit 20 is output. Each prism groove 14 is formed by a pair of slopes that are inclined from a reference surface N of the reflecting surface 12c. One of the pair of slopes is a slight slope 14a and the other is a steep slope 14b that is steeper than the slight slope 14a. The luminance uniformity of the front light 10 can be increased by increasing the inclination angle of the slight slope 14a as the light guide plate 12 becomes shorter in the light traveling direction. Light traveling right to left (in FIG. 3) inside the light guide plate 12 is reflected by the steep slopes 14b of the reflecting surface 12c toward the light exit surface 12b, as a result of which the light is emitted toward the liquid crystal display unit 20 that is disposed on the back side of the light guide plate 12.

In the front light 10 according to this embodiment, the inclination angle θ1 (see FIG. 3) of the slight slopes 14a with respect to the reference surface N of the reflecting surface 12c is in a range of 1° to 10° and the inclination angle θ2 of the steep slopes 14b is in a range of 41° to 45°. The inclination angles θ1 and θ2 in the above ranges allow light traveling inside the light guide plate 12 to be applied efficiently to the liquid crystal display unit 20, and thereby make it possible to construct a liquid crystal display device capable of bright display. A high-luminance illumination device can be obtained in which the quantity of exit light from the light guide plate 12 is uniform in its light exit surface 12b and the efficiency of utilization of the light source is high. If the inclination angle θ1 of the slight slopes 14a is smaller than 1°, the average luminance of the front light 10 is low. If it is larger than 10°, the quantity of exit light from the light guide plate 12 cannot be made uniform in its light exit surface 12b. If the inclination angle θ2 of the steep slopes 14b is smaller than 41° or larger than 45°, the deviation of the traveling direction of light reflected by the steep slopes 14b from the normal direction of the light exit surface 12b becomes large and hence the quantity of exit light from the light exit surface 12b (i.e., the luminance of the front light 10) decreases. Therefore, such ranges of the inclination angle θ2 are not preferable.

In the front light 10 according to this embodiment, the prism grooves 14 of the light incident surface 12a of the light guide plate 12 are formed in such a manner that the width of the steep slope 14b increases as the position goes away from the light incident surface 12a, more specifically, the width of the steep slope 14b is equal to 1.1 to 1.5 at the position farthest from the light incident surface 12a (i.e., at the end of the sideline of the light guide plate 12 that is opposite to the light incident surface 12a) if it is assumed to be 1.0 at the position closest to the light incident surface 12a.

In the front light 10 according to this embodiment, the width of the steep slope 14b is measured in the direction perpendicular to the extending direction of the prism grooves 14.

Having the above structure, the front light 10 according to this embodiment is superior in the uniformity of the quantity of exit light in the light exit surface 12b of the light guide plate 12. More specifically, the quantity of light traveling inside the light guide plate 12 is maximum at the light incident surface 12a and decreases as it goes away from the light incident surface 12a, because part of the light is reflected by the prism grooves 14 and exits from the light exit surface 12b as the light travels inside the light guide plate 12. In the front light 10 according to this embodiment, the proportion of the quantity of exit light with respect to the quantity of traveling light is varied in accordance with the distance from the light incident surface 12a. Therefore, the distribution of the quantity of exit light can be made uniform in the light exit surface 12b of the light guide plate 12, whereby a liquid crystal display device having a uniform luminance distribution can be realized.

As described above, it is appropriate to form the prism grooves 14 in such a manner that the width of the steep slope 14b of increases as the position goes away from the light incident surface 12a, more specifically, the width of the steep slope 14b is in the range of 1.1 to 1.5 at the position farthest from the light incident surface 12a (i.e., at the end of the sideline of the light guide plate 12 that is opposite to the light incident surface 12a) if it is assumed to be 1.0 at the position closest to the light incident surface 12a. Two adjoining prism grooves 14 are formed in such a manner that the steep slope 14b of the one prism groove 14 farther from the light incident surface 12a is wider than that of the other prism groove 14. More specifically, the prism grooves 14 are formed in such a manner that the width of the steep slope 14b increases every predetermined length or every percentage in length as the position goes comes closer to the end of the sideline that is opposite to the light incident surface 12a.

The pitch P1 of prism grooves 14 (i.e., the interval between the bottom apices of prism grooves 14) is fixed in the reflecting surface 12c of the light guide plate 12. That is, the prism grooves 14 are formed parallel with each other at prescribed intervals. Further, in the front light 10 according to this embodiment, the depth of the prism groove 14 (i.e., the distance between the reference surface N and the bottom apex of the prism groove 14) is also fixed in the reflecting surface 12c.

As described above, the pitch P1 and the depth of the prism grooves 14 that are formed in the reflecting surface 12c are fixed and the width of the steep slope 14b of the prism groove 14 increases as the position goes away from the light incident surface 12a of the light guide plate 12. Therefore, the inclination angle θ2 of the steep slope 14b of the prism groove 14 is maximum at the position closest to the light incident surface 12a and decreases gradually as the position goes away from the light incident surface 12a.

The pitch P1 and the depth of the prism grooves 14 need not always be fixed in the reflecting surface 12c; forming the prism grooves 14 with a variable pitch P1 and depth is within the technical scope of the invention. That is, the width of the steep slope 14b may be determined by adjusting the pitch P1 and the depth while fixing the inclination angles θ1 and θ2 of the prism groove 14.

In the front light 10 according to this embodiment, as shown in FIGS. 1 and 2, the prism grooves 14 of the reflecting surface 12c are inclined in such a manner that their extending directions intersect the side end face 12a of the light guide plate 12. More specifically, it is preferable that the prism grooves 14 be formed in such a manner that, as shown in FIG. 2, the inclination angle α of the prism grooves 14, that is, the angle formed by the prism grooves 14 and the side end face 12a of the light guide plate 12, is larger than 0° and smaller than or equal to 15°. Setting the inclination angle α within this range makes it possible to uniformize the distribution of the quantity of exit light in the light exit surface 12b of the light guide plate 12. It is even more preferable that the inclination angle α be in a range of 6.5° to 8.5°. This makes it possible to provide a front light that produces a moiré pattern less likely and is superior in the uniformity of exit light.

Examples of the material of the light guide plate 12, other than an acrylic resin, are transparent resin materials such as a polycarbonate resin and an epoxy resin and glass. Specifically, ARTON (trade name) of JSR Corp. and ZEONOR (trade name) of Nippon Zeon Co., Ltd. are preferable though the material is not limited to these.

The degree of uniformity of the exit light quantity can be increased in the entire light guide plate 12 by making the light guide plate 12 thicker. It is therefore preferable to make the thickness of the light guide plate 12 be 0.8 mm or more, and it is even preferable to make the thickness 1.0 mm or more. Even if the thickness is made greater than 1.5 mm, the luminance does not become much higher than in a range of 1.0 to 1.5 mm. In view of the thinning of the front light 10, it is appropriate to set the upper limit of the thickness to 1.5 mm.

Figure 4:
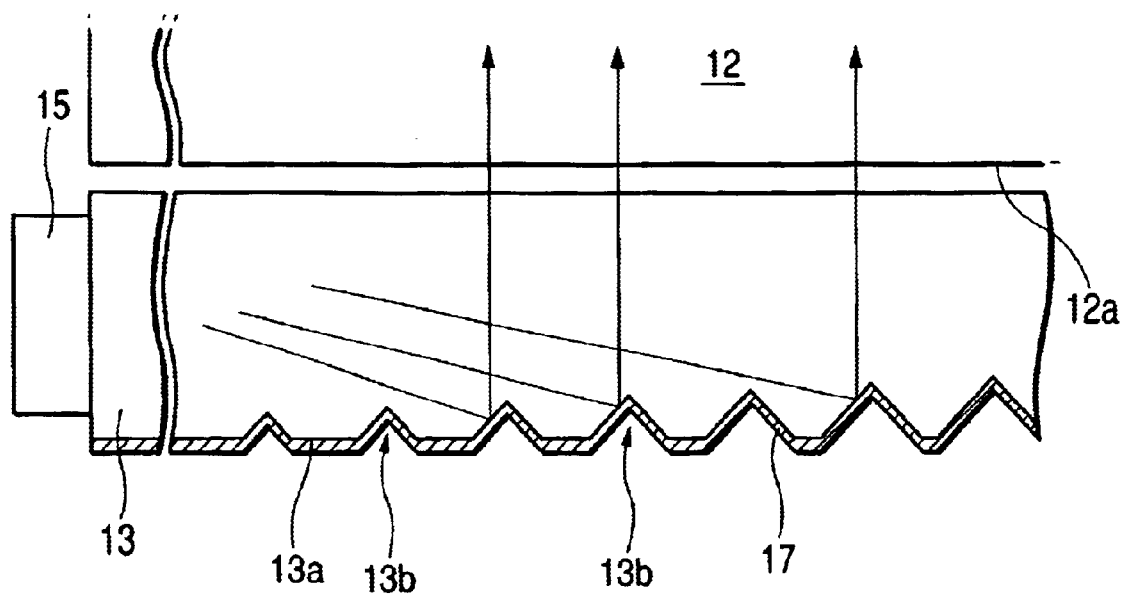
FIG. 4 is an enlarged plan view showing the structure of an intermediate light guide shown in FIG. 2.

The intermediate light guide 13 is a quadratic-prism-shaped transparent member and extends along the side end face (light incident surface) 12a of the light guide plate 12. The light-emitting element 15 is disposed adjacent to one side end face of the intermediate light guide 13. FIG. 4 is an enlarged plan view showing the structure of the intermediate light guide 13. As shown in FIG. 4, the bottom surface (in FIG. 4; the surface opposite to the light guide plate 12) is a prism surface 13a in which a plurality of wedge-shaped (in a plan view) grooves 13b are arranged parallel with each other. Light that is emitted from the light-emitting element 15 travels inside the intermediate light guide 13 in its longitudinal direction. The light is reflected by the surfaces of the wedge-shaped grooves 13b and exit toward the light guide plate 12. As shown in FIG. 4, the depth of the wedge-shaped groove 13b increases as the position goes away from the light-emitting element 15, which makes it possible to illuminate the side end face 12a of the light guide plate 12 uniformly.

The prism surface 13a of the intermediate light guide 13 that is formed with the wedge-shaped grooves 13b is coated with a reflection film 17 that is a high-reflectance metal thin film of Al, Ag, or the like. The reflection film 17 increases the reflectance of the prism surface 13a and thereby increases the quantity of light that enters the light guide plate 12.

Examples of the material of the intermediate light guide 13, other than an acrylic resin, are transparent resin materials such as a polycarbonate resin and an epoxy resin and glass. The light-emitting element 15 may be of any type as long as it can be disposed adjacent to an end face of the intermediate light guide 13, and a white LED (Light Emitting Diode), an organic EL element and the like may be used. It goes without saying that the light-emitting element 15 may be disposed adjacent to both end faces of the intermediate light guide 13. If necessary, one or a plurality of light-emitting elements themselves may be disposed adjacent to the light incident surface 12a.

Figure 5:
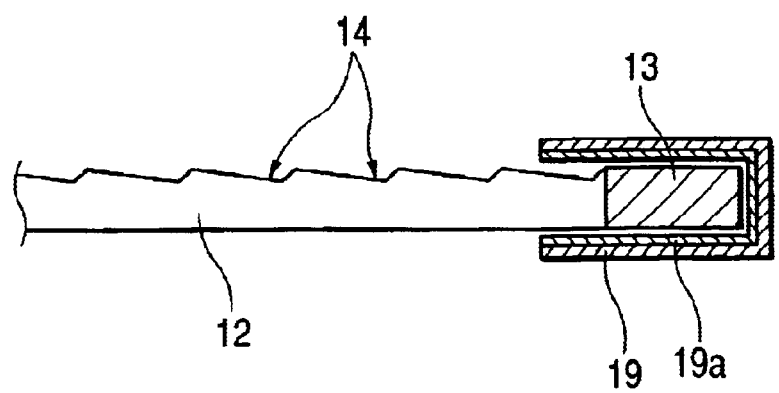
FIG. 5 is a partial sectional view of a front light shown in FIG. 1.

As shown in FIG. 1, in the front light 10, the case body 19 is attached from the side of the intermediate light guide 13. FIG. 5 shows a sectional structure of the front light 10 including the case body 19. As shown in FIG. 5, a reflection film 19a that is a high-reflectance metal thin film of Al, Ag, or the like is formed on the inner surfaces of the case body 19. Light that leaks out of the intermediate light guide 13 and side end portions of the light guide plate 12 is reflected by the reflection film 19a, whereby the light re-enters the intermediate light guide 13 and hence can be used as illumination light. With this structure, the front light 10 according to this embodiment can efficiently utilize light that is emitted from the light-emitting element 15 and hence can illuminate the liquid crystal display unit 20 at high luminance.

In the example of FIG. 5, the reflection film 19a is formed on the inner surface of the case body 19. However, the invention is not limited to this example. Other structures capable of returning, to the intermediate light guide 13, light that leaks out of the intermediate light guide 13 can be employed. For example, the case body 19 itself may be made of a reflective metal material. Or reflective metal thin films may be formed on outer surfaces of the intermediate light guide 13 and the surfaces of side end portions of the light guide plate 12 by such a film forming method as sputtering, to prevent leakage of light from the intermediate light guide 13 and the side end portions of the light guide plate 12.

[Liquid Crystal Display Unit]

The liquid crystal display unit 20 is a reflection-type passive matrix liquid crystal display unit capable of color display. As shown in FIG. 3, a liquid crystal layer 23 is held between a top substrate 21 and a bottom substrate 22 that are opposed to each other. A plurality of strip-shaped (in a plan view) transparent electrodes 26a are formed on the inner surface of the top substrate 21 so as to extend in the right-left direction in FIG. 3 and an alignment film 26b is formed on the transparent electrodes 26a. A reflection layer 25, a color filter layer 29, a plurality of strip-shaped (in a plan view) transparent electrodes 28a, and an alignment film 28b are formed on the inner surface of the bottom substrate 22.

The transparent electrodes 26a on the top substrate 21 and the transparent electrodes 28a on the bottom substrate 22 both assume strip shapes in a plan view and are both arranged in stripe form in a plan view. The extending direction of the transparent electrodes 26a is perpendicular to that of the transparent electrodes 28a in a plan view. Therefore, one dot of the liquid crystal display unit 20 is formed at a crossing point of one transparent electrode 26a and one transparent electrode 28a. One of color filters of three colors (red, green, and blue; described later) is provided for each dot. As shown in FIG. 3, three dots that produce R (red), G (green), and B (blue), respectively, constitute one pixel 20c of the liquid crystal display unit 20. As shown in the plan view of FIG. 2, a lot of pixels 20c are arranged in matrix form in the display area 20D.

The color filter layer 29 is formed in such a manner that red, green, and blue color filters 29R, 29G, and 29B are arranged periodically. Each color filter is formed under the associated transparent electrode 28a. A set of color filters 29R, 29G, and 29B is provided for each pixel 20c. The display color of each pixel 20C is controlled by drive-controlling electrodes corresponding to the respective color filters 29R, 29G, and 29B.

In the liquid crystal display device according to this embodiment, the extending direction of the prism grooves 14 that are formed in the light guide plate 12 of the front light 10 crosses the arrangement direction of the pixels of the liquid crystal display unit 20. That is, the RGB repetition direction of the color filter layer 29 that gives a periodic pattern to the liquid crystal display unit 20 is not parallel with the extending direction of the prism grooves 14, to prevent occurrence of a moiré pattern due to optical interference between them.

Figure 6:
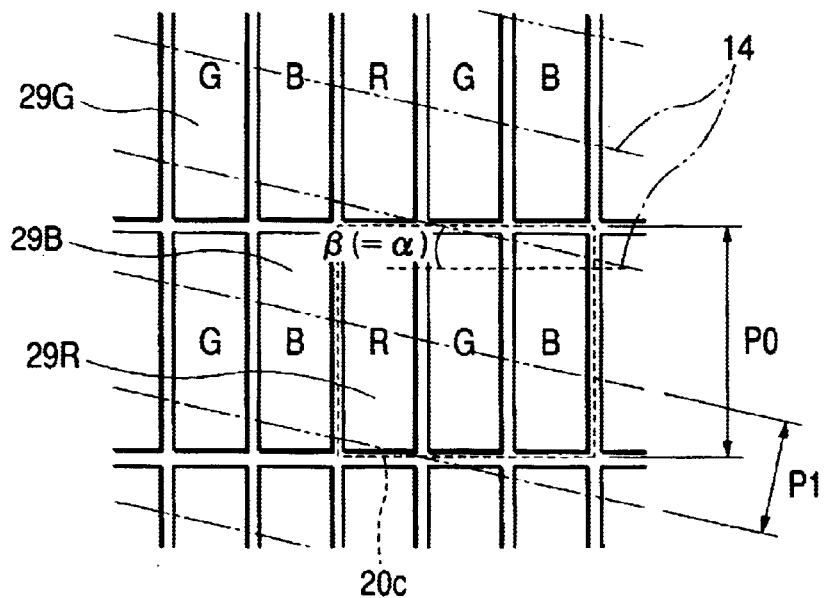
FIG. 6 is an enlarged plan view showing the structure of pixels of a liquid crystal display unit shown in FIG. 2.

FIG. 6 is an enlarged plan view showing the structure of adjoining pixels of the liquid crystal display unit 20 of FIG. 2. As shown in FIG. 6, a plurality of pixels 20c are formed in matrix form (in a plan view) in the liquid crystal display unit 20. Each pixel 20c is provided with a set of red, green, and blue color filters 29R, 29G, and 29B. In the liquid crystal display device according to this embodiment, as shown in FIG. 6, the extending directions (indicated by two-dot chain lines in FIG. 6) of the prism grooves 14 of the front light 10 are inclined by an angle β with respect to the arrangement direction (right-left direction in FIG. 6) of the pixels 20c of the liquid crystal display unit 20.

It is preferable that the inclination angle β of the prism grooves 14 with respect to the arrangement direction (right-left direction in FIG. 6) of the pixels 20c be larger than 0° and smaller than or equal to 15°, and an even more preferable range is 6.5° to 8.5°. Setting the inclination angle β within this range makes it possible to prevent occurrence of a moiré pattern due to optical interference with the periodic structure of the pixels of the liquid crystal display unit 20. The inclination angle β out of the above range tends to lessen the effect of suppressing a moiré pattern. Setting the inclination angle β within the range of 6.5° to 8.5° enhances the effect of preventing a moiré pattern.

In the liquid crystal display device according to this embodiment, as shown in FIG. 2, the side end face 12a of the light guide plate 12 of the front light 10 is parallel with the pixel arrangement direction of the liquid crystal display unit 20. Therefore, the angle α that is formed by the extending direction of the prism grooves 14 and the side end face 12a of the light guide plate 12 coincides with the angle β that is formed by the extending direction of the prism grooves 14 and the arrangement direction of the pixels 20c. However, if the side end face 12a of the light guide plate 12 is not parallel with the arrangement direction of the pixels 20c, the inclination angles α and β are different from each other. In this case, to suppress a moiré pattern, it is preferable to set the inclination angle β within the above range with priority given to it over the inclination angle α. Once the inclination angle β is determined, the extending direction of the prism grooves 14 is determined. To make the distribution of exit light from the light guide plate 12 uniform, it is appropriate to adjust the direction of the side end face 12a of the light guide plate 12 with respect to the extending direction of the prism grooves 14 so that the inclination angle α falls within the above range.

Having a periodic repetition pattern, the arrangement of the pixels 20c (and the color filters) of the liquid crystal display unit 20 may optically interfere with the prism grooves 14 of the light guide plate 12. The pitch of the prism grooves 14 of the front light 10 and the pitch of the pixels 20c (see FIGS. 3 and 6) have a close relationship. The optical interference can be suppressed more effectively by controlling the two kinds of pitches so that they fall within proper ranges. More specifically, a moiré pattern can be suppressed effectively by setting the pitch P1 of the prism grooves 14 and the pitch P0 of the pixels 20c (see FIG. 6) so that they satisfy a relationship (½)P0<P1<(¾)P0. In general, the pixel pitch P0 of the liquid crystal display unit 20 is determined by specifications (a panel size and a resolution) of an electronic apparatus incorporating the liquid crystal display device. Therefore, a liquid crystal display device that is free of a moiré pattern and superior in legibility can be obtained by setting the pitch P1 of the prism grooves 14 of the front light 10 in accordance with such a pixel pitch so as to fall within the above range.

Figure 7:
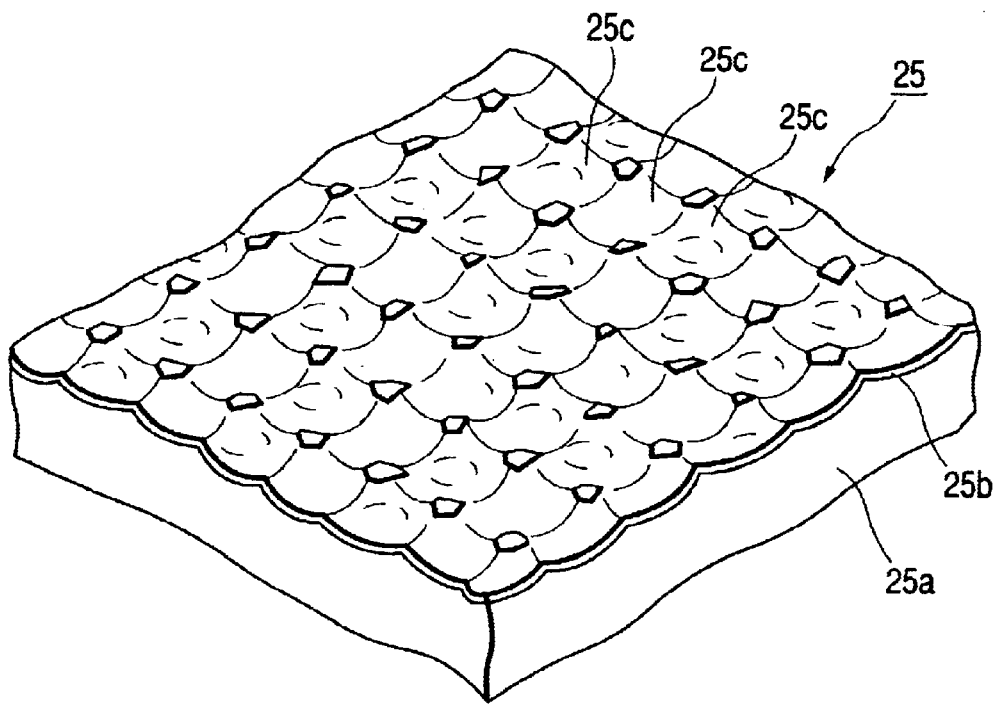
FIG. 7 is a perspective view showing the structure of a reflection layer shown in FIG. 3.

Next, as shown in a perspective view of FIG. 7, the reflection layer 25 that is formed on the inner surface of the bottom substrate 22 (see FIG. 3) is composed of a high-reflectance reflection film 25b of Al, Ag, or the like and an organic film 25a that is made of an acrylic resin material and serves to give a prescribed surface shape to the metal reflection film 25b. The surface of the reflection layer 25 is formed with a plurality of reflective recesses 25c.

The organic film 25a can be obtained by forming a flat resin layer made of a photosensitive resin or the like on the bottom substrate 22 and then pressing, against the surface of the resin layer, a transfer mold that is made of an acrylic resin or the like and whose surface shape (projections and recesses) is opposite to the surface shape of the organic film 25a to be obtained. The organic film 25a can also be formed by photolithography or the like with multi-step exposure using a plurality of masks. The reflection film 25b is formed on the thus-formed organic film 25a whose surface is formed with recesses. The reflection film 25b can be formed by depositing a high-reflectance metal material such as aluminum or silver by such a film forming method as sputtering or vacuum deposition.

In this embodiment, it is preferable that the reflection layer 25 have a reflection characteristic that the reflection luminance is approximately symmetrical with respect to an incident light specular reflection angle. In the reflection layer 25, the inside surface shapes of the many recesses 25c of the surface of the reflection film 25b are controlled so as to provide such a reflection characteristic.

In this embodiment, it is desirable that the depth of the recess 25c be varied randomly in a range of 0.1 to 3 μm, that the pitch of adjoining recesses 25c be varied randomly in a range of 5 to 100 μm, and that the inclination angles of the inside surfaces of the recesses 25c be set (distributed) within the range of −18° to +18°.

Figure 8:
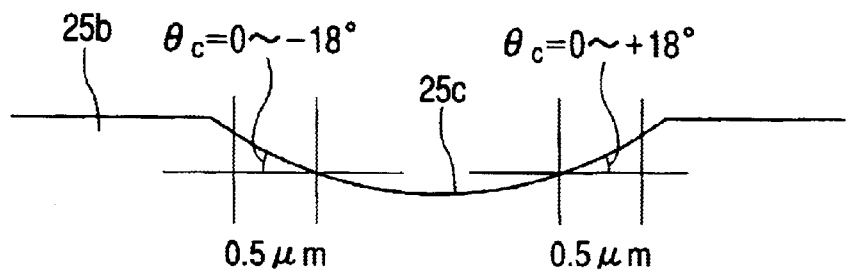
FIG. 8 illustrates a sectional shape of a recess shown in FIG. 7.

In this specification, the term "depth of a recess 25c" means a distance from the surfaces of the portions of the reflection film 25b other than the recesses 25c to the bottom of the recess 25c. The term "pitch between adjoining recesses 25c" means a distance between the centers of circular recesses 25c in a plane view. The term "inclination angle of the inside surface of a recess 25c" means, as shown in FIG. 8, an angle θc of a slope with respect to the horizontal plane (i.e., the surface of the base member) in a very small area that has a width of 0.5 μm and is located at an arbitrary position on the inside surface of the recess 25c. The sign of the angle θc is defined with respect to the normal to the surfaces of the portions of the reflection film 25b other than the recesses 25c in such a manner that, for example, the right-hand slope in FIG. 8 is given a plus sign and the left-hand slope in FIG. 8 is given a minus sign.

In this embodiment, the inclination angles of the inside surfaces of the recesses 25c be set (distributed) within the range of −18° to +18°, and that the pitch of adjoining recesses 25c be varied randomly in a range of 5 to 100 μm in all directions on the surface. This is because if the pitch of adjoining recesses 25c varies with some regularity, a problem arises that reflection light assumes a certain color due to an interference color of light, and because if the inclination angles of the inside surfaces of the recesses 25c vary in a range that is wider than −18° to +18°, the diffusion angle of reflection light becomes so wide that the reflection light intensity lowers to disable bright display (the diffusion angle of reflection light becomes more than 55° in the air).

If the depths of the recesses 25c are less than 0.1 μm, the light diffusion effect that is attained by forming the recesses 25c in the surface of the reflection layer 25 is insufficient. If the depths of the recesses 25c are greater than 3 μm, the pitches should be increased to obtain a sufficient light diffusion effect, which may cause a moiré pattern.

In practice, in view of the work time of manufacture of a press mold and the work time of manufacture of masks for photolithography or the like, it is desirable that the pitch of adjoining recesses 25c be 5 to 100 μm.

Figure 9:
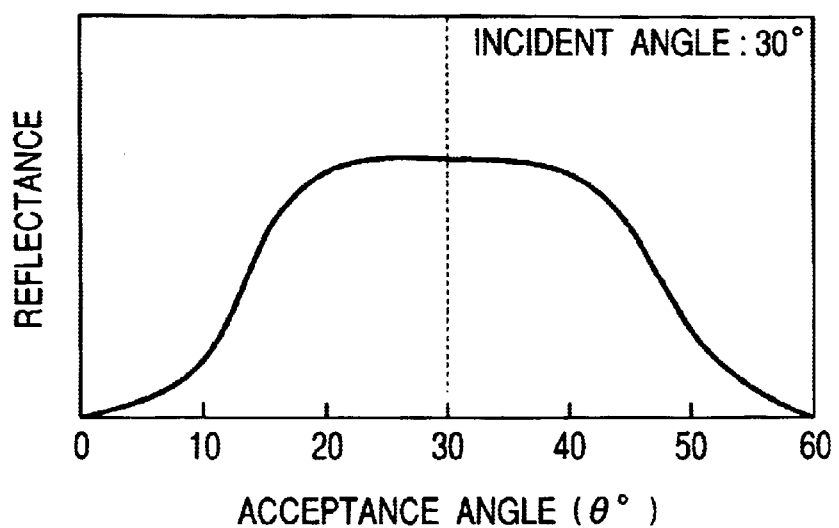
FIG. 9 is a graph showing a reflection characteristic of a reflection layer having the recesses of FIG. 8.

FIG. 9 shows a relationship between the acceptance angle (unit: °) and the brightness (reflectance; unit: %) in a case that light is applied at an incident angle of 30° from the side of the display surface (top surface) of the liquid crystal display unit 20 according to this embodiment and the acceptance angle is varied in a range of 0° (perpendicular position, normal direction) to 60° that is centered by 30° (the direction of specular reflection from the display surface) As shown in FIG. 9, the reflectance is almost uniform in a wide acceptance angle range and has a symmetrical curve with respect to the specular reflection direction. In particular, the reflectance is almost constant in an acceptance angle range of ±10° that is centered by the specular reflection direction, which indicates that in this view angle range a display of approximately the same brightness can be obtained from any direction.

The reasons why the reflectance can be made almost uniform in a wide acceptance angle range and has a symmetrical curve with respect to the specular reflection direction are that the depths and the pitches of the recesses 25c shown in FIG. 7 are controlled so as to fall within the above-mentioned ranges and that the inside surface of each recess 25c is part of a sphere. That is, since the depths and the pitches of the recesses 25c are controlled, the inclination angles of the inside surfaces of the recesses 25c which dominate the reflection angle of light are controlled so as to fall within the prescribed range, which makes it possible to control the reflection efficiency of the reflection film 25b so that it falls within a prescribed range. Since the inside surface of each recess 25c assumes part of a sphere which is rotation-symmetrical, the reflectance can be made uniform in a wide reflection angle range of the reflection film 25b.

[First Modification of Reflection Layer]

Instead of the reflection layer 25 of the liquid crystal display unit 20 according to the above embodiment that has the reflection characteristic that the reflection luminance distribution is almost symmetrical with respect to the specular reflection direction, a reflection layer whose reflection characteristic is such that the reflection luminance distribution is not symmetrical with respect to the specular reflection direction may be employed. A reflection layer having such a reflection characteristic will be described below with reference to FIGS. 10 and 11.

A reflection layer having such a reflection characteristic can be formed by varying the inside surface shape of the recess 25c (see FIG. 7). More specifically, the reflection layer according to this modification is the same as the reflection layer 25 according to the above embodiment that is shown in the perspective view of FIG. 7 in that the reflection layer is obtained by forming a high-reflectance reflection film 25b on an organic film 25a whose reflection surface side is formed with a lot of recesses 25c that are arranged so as to be connected to each other. The reflection layer according to this modification is different from the reflection layer 25 according to the above embodiment only in the inside surface shape of each recess 25c. Therefore, FIG. 7 is also used for describing each component of the reflection layer according to this modification.

Figure 10:
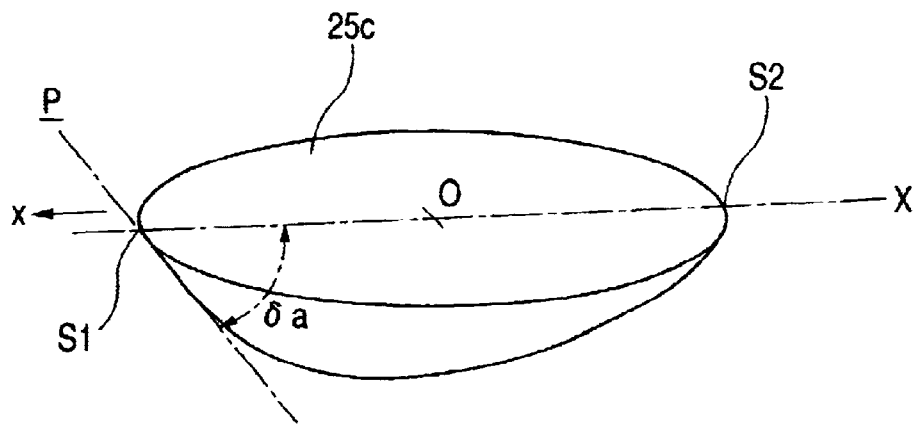
FIG. 10 is a perspective view of a recess according to a first modification of the reflection layer.
Figure 11:
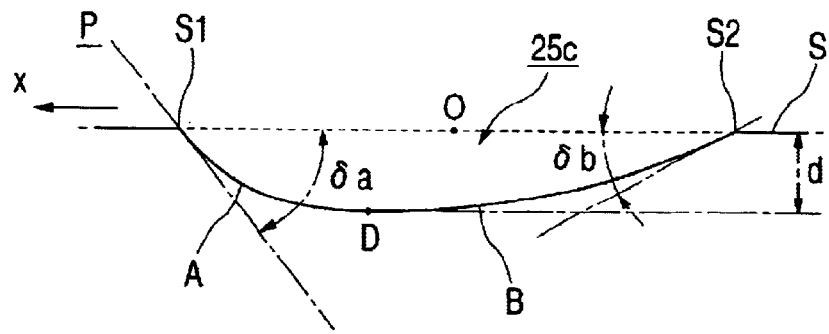
FIG. 11 is a sectional view of a vertical cross-section X shown in FIG. 10.

FIGS. 10 and 11 show one of a lot of recesses 25c that are formed in the reflection layer according to this modification having an unsymmetrical reflection luminance distribution with respect to the specular reflection direction. FIG. 10 is a perspective view showing its structure. FIG. 11 is a sectional view of a particular vertical cross-section X shown in FIG. 10.

As shown in FIG. 11, a curve representing an inside surface shape of the recess 25c in the particular vertical cross-section X of the recess 25c consists of a first curve A extending from one end point S1 of the recess 25c to a deepest point D and a second curve B that is continuous with the first curve A and extends from the deepest point D to the other end point S2. The two curves A and B have an inclination angle of 0° with respect to the reflection film surface S at the deepest point D and are connected to each other there.

The term "inclination angle" means an angle that is formed by the tangent to the inside surface of the recess 25c at an arbitrary position in a particular vertical cross-section and the horizontal plane (in this case, the reflection film surface S of the portions other than the recesses 25c).

The inclination angle of the first curve A with respect to the reflection film surface S is larger than that of the second curve B, and the deepest point D is deviated in a direction x from the center O of the recess 25c. That is, the average of the absolute values of inclination angles of the first curve A with respect to the reflection film surface S is greater than that of the second curve B. In the recesses 25c that are formed in the surface of the diffusive reflection layer, the average of the absolute values of inclination angles of the first curves A with respect to the reflection film surface S varies irregularly in a range of 1° to 89° and the average of the absolute values of inclination angles of the second curves B with respect to the reflection film surface S varies irregularly in a range of 0.5° to 88°.

Since the inclination angle of each of the curves A and B varies gently, a maximum inclination angle δa (absolute value) of the first curve A is larger than a maximum inclination angle δb (absolute value) of the second curve B. The inclination angle with respect to the base member surface at the deepest point D where the first curve A and the second curve B are connected to each other is equal to 0°. At the deepest point D, the first curve A having negative inclination angles and the second curve B having positive inclination angles are smoothly connected to each other.

In the recesses 25c that are formed in the surface of the reflection layer, the maximum inclination angle δa varies irregularly in a range of 2° to 90°; in most recesses 25c, the maximum inclination angle δa varies irregularly in a range of 4° to 35°.

The concave surface of each recess 25c has a single minimum height point (i.e., a point on a curved surface where the inclination angle is equal to 0°) D. The distance between the minimum height point D and the reflection film surface S of the base member is a depth d of the recess 25c. The depth d varies irregularly in a range of 0.1 to 3 μm.

In this modification, the particular vertical cross-sections X of the respective recesses 25c extend along the same direction. The recesses 25c are formed in such a manner that the first curves A extend along the single direction. That is, all the recesses 25c are formed in such a manner that the direction x which is indicated by the arrow in FIGS. 10 and 11 is the same.

In the reflection layer having the above structure, since the first curves A of the recesses 25c extend along the single direction, the direction of reflection light of light that shines on the reflection layer obliquely from above from the direction x side (see FIG. 11; the side of the first curve A) is shifted from the direction of specular reflection toward the normal to the reflection film surface S.

Conversely, the direction of reflection light of light that shines on the reflection layer obliquely from above from the side opposite to the direction x side (see FIG. 11; the side of the second curve B) is shifted from the direction of specular reflection toward the reflection film surface S.

Therefore, a total reflection characteristic for the particular vertical cross-section X becomes such that the reflectance increases in directions of reflection light reflected by a surface around each second curve B. In this manner, a reflection characteristic can be obtained in which the reflection efficiency is increased selectively in a particular direction.

Figure 12:
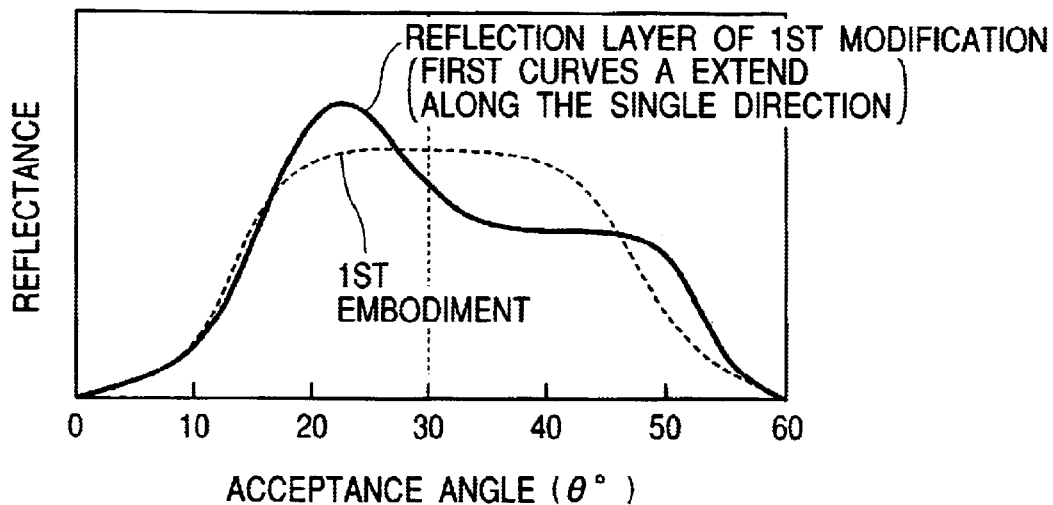
FIG. 12 is a graph showing a reflection characteristic of a reflection layer having the recesses shown in FIGS. 10 and 11.

FIG. 12 shows a relationship between the acceptance angle (unit: °) and the brightness (reflectance; unit: %) in a case that light is applied from the direction x side at an incident angle of 30° to the reflecting surface (i.e., the surface of the reflection film 25b) of the reflection layer that is used in this modification and the acceptance angle is varied in a range of 0° (perpendicular position, normal direction) to 60° that is centered by 30° (the direction of specular reflection from the reflecting surface). FIG. 12 also shows the relationship between the acceptance angle and the reflectance that is obtained when the recesses 25c having the sectional shape of FIG. 8 are formed. As shown in FIG. 12, in this modification, a peak reflectance value is located at a reflection angle that is smaller than the reflection angle 30° of specular reflection that corresponds to the incident angle 30° and the reflectance is high in its vicinity.

Therefore, the reflection layer having the above structure can efficiently reflect and diffuse light that is emitted from the light guide plate 12, because the reflection film 25b whose surface serves as the reflecting surface has the above-described shape. Further, the reflection layer has such directivity as to produce a large reflectance value in a particular direction. As a result, the exit angle range of reflection light that is output after being reflected by the reflection layer is wide and the exit efficiency can be increased at a particular exit angle.

[Second Modification of Reflection Layer]

A reflection luminance distribution that is not symmetrical with respect to a direction of specular reflection of incident light can also be attained by a reflection layer having the following structure, which will be described below as a second modification.

As in the case of the first modification, the reflection layer according to this modification can be formed by modifying the inside surface shape of each recess 25c shown in FIG. 7. More specifically, the reflection layer according to this modification is the same as the reflection layer 25 according to the first embodiment that is shown in the perspective view of FIG. 7 in that the reflection layer is obtained by forming a high-reflectance reflection film 25b on an organic film 25a whose reflection surface side is formed with a lot of recesses 25c that are arranged so as to be connected to each other. The reflection layer according to this modification is different from the reflection layer 25 according to the first embodiment only in the inside surface shape of each recess 25c. Therefore, FIG. 7 is also used for describing each component of the reflection layer according to this modification.

Figure 13:
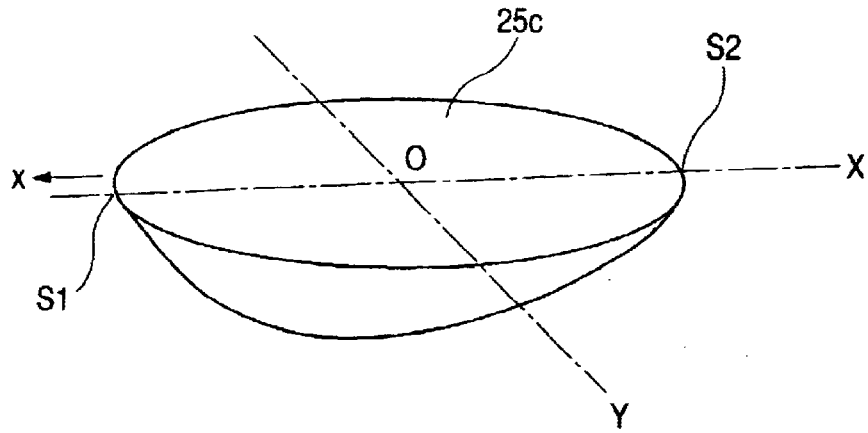
FIG. 13 a perspective view of a recess according to a second modification of the reflection layer.
Figure 14:
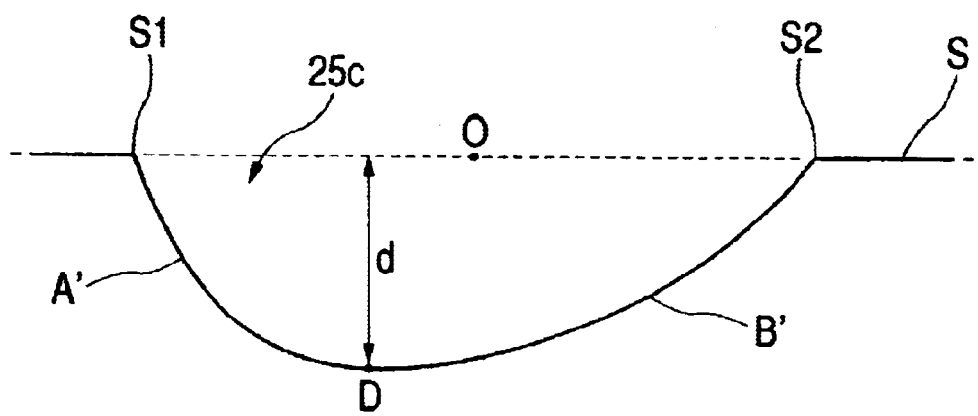
FIG. 14 is a sectional view of a vertical cross-section X shown in FIG. 13.
Figure 15:
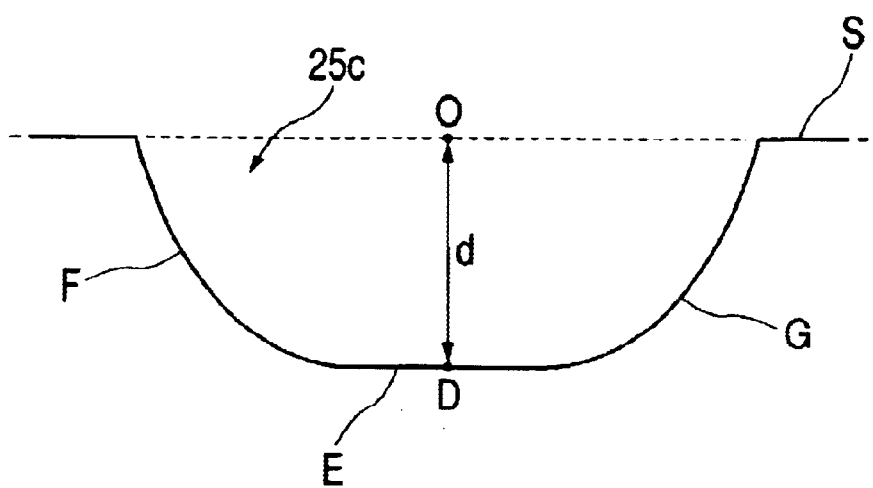
FIG. 15 is a sectional view of a vertical cross-section Y shown in FIG. 13.

FIGS. 13–15 show the inside surface shape of one of the recesses 25c that are formed in the surface of the reflection film 25b of the reflection layer according to this modification. FIG. 13 is a perspective view of the recess 25c. FIG. 14 shows a cross-section (called "vertical cross-section X") including an X axis of the recess 25c. FIG. 15 shows a cross-section (called "vertical cross-section Y") including a Y axis of the recess 25c that is perpendicular to the X axis.

As shown in FIG. 14, a curve representing an inside surface shape of the recess 25c in the vertical cross-section X consists of a first curve A' extending from one end point S1 of the recess 25c to a deepest point D and a second curve B' that is continuous with the first curve A' and extends from the deepest point D to the other end point S2. The first curve A' which falls as the position goes rightward and the second curve B' which rises the position goes rightward both have an inclination angle of 0° with respect to the reflection film surface S at the deepest point D and are connected smoothly to each other there.

The term "inclination angle" means an angle that is formed by the tangent to the inside surface of the recess 25c at an arbitrary position in a particular vertical cross-section and the horizontal plane (in this case, the reflection film surface S of the portions other than the recesses 25c).

The inclination angle of the first curve A' with respect to the reflection film surface S is larger than that of the second curve B', and the deepest point D is deviated from the center O of the recess 25c along the X axis in a direction toward the end point S1 (direction x). That is, the average of the absolute values of inclination angles of the first curve A' is greater than that of the second curve B'. In the recesses 25c that are formed in the surface of the reflection layer, the average of the absolute values of inclination angles of the first curves A' varies irregularly in a range of 2° to 90° and the average of the absolute values of inclination angles of the second curves B' varies irregularly in a range of 1° to 89°.

On the other hand, as shown in FIG. 15, an inside surface shape of the recess 25c in the vertical cross-section Y is almost symmetrical with respect to the vertical line passing through the center O of the recess 25c. In the vicinity of the deepest point D of the recess 25c, the inside surface shape assumes a shallow-mold curve E having a large radius of curvature, that is, being close to a straight line. In the left and right regions of the shallow-mold curve E, the inside surface shape assumes deep-mold curves F and G having a small radius of curvature. In the recesses 25c that are formed in the surface of the reflection layer 25, the absolute values of inclination angles of shallow-mold curves E are smaller than about 10°. In the recesses 25c, the absolute value of the inclination angle of the deep-mold curves F and G varies irregularly and falls within a range of 2° to 90°, for example. The depth d of the deepest point D varies irregularly in a range of 0.1 to 3 μm.

In this modification, in the recesses 25c that are formed in the surface of the reflection layer, the vertical cross-sections X extend along the same direction and the vertical cross-sections Y also extend along the same direction. The directions from the deepest point D past the first curve A' to the end point S1 extend along the same direction. That is, all the recesses 25c are formed in the surface of the reflection layer in such a manner that the direction x which is indicated by the arrow in FIGS. 13 and 14 is the same.

In this modification, since the recesses 25c formed in the surface of the reflection layer are oriented in the same direction and the directions from the deepest point D past the first curve A' to the end point S1 extend along the same direction, the direction of reflection light of light that shines on the reflection layer obliquely from above from the direction x side (see FIGS. 13 and 14; the side of the first curve A') is shifted from the direction of specular reflection toward the normal to the reflection film surface S.

Conversely, the direction of reflection light of light that shines on the reflection layer obliquely from above from the side opposite to the direction x side (see FIGS. 13 and 14; the side of the second curve B') is shifted from the direction of specular reflection toward the reflection film surface S.

Further, the vertical cross-section Y, which is perpendicular to the vertical cross-section X, has the shallow-mold curve E having a large radius of curvature and deep-mold curves F and G that are located on the two respective sides of the shallow-mold curve E and have a small radius of curvature. This increases the reflectance in the specular reflection direction of the reflection surface of the reflection layer.

Figure 16:
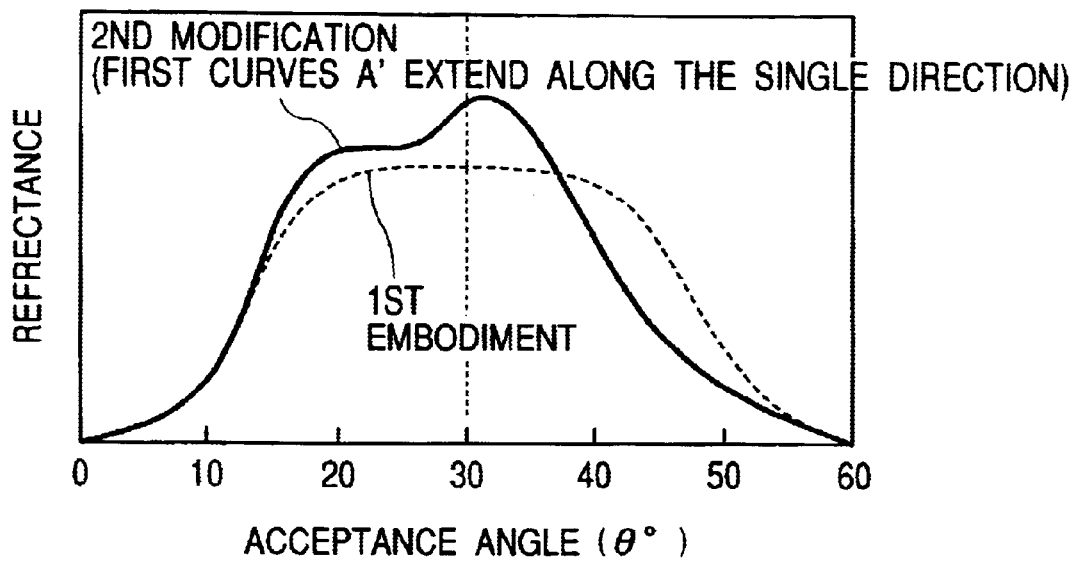
FIG. 16 is a graph showing a reflection characteristic of a reflection layer having the recesses shown in FIGS. 13–15.

As a result, as shown in FIG. 16, a total reflection characteristic for the vertical cross-section X becomes such that reflection light is concentrated moderately in a particular direction while the reflectance in the specular reflection direction is kept sufficiently high. FIG. 16 shows a relationship between the view angle ($\theta°$) and the brightness (reflectance) in a case that light is applied to the reflection layer according to this modification from the direction of an incident angle 30° that is inclined from the normal to the reflection film surface S toward the direction x and the view angle is varied continuously in a range of 0° (perpendicular position) to 60° that is centered by 30° (the direction of specular reflection from the reflection film surface S). The reflection characteristic represented by this graph is such that the integration value of the reflectance in a reflection angle range that is smaller than the specular reflection angle 30° than that in a reflection angle range that is larger than the specular reflection angle, which means that the reflection direction is shifted from the specular reflection direction toward the normal.

Therefore, the liquid crystal display unit that is provided with the reflection layer having the above structure can efficiently reflect and diffuse light that is emitted from the light guide plate 12, because the reflection film 25b whose surface serves as the reflecting surface of the reflection layer has the above-described shape. Further, the reflection layer has such directivity as to produce a large reflectance value in a particular direction. As a result, the exit angle range of reflection light that is output after being reflected by the reflection layer is wide and the exit efficiency can be increased at a particular exit angle.

[Active Matrix Liquid Crystal Display Unit]

Although in the above embodiment the liquid crystal display unit 20 is of a passive matrix type, the liquid crystal display device according to the invention can also employ an active matrix type liquid crystal display unit. Also in the latter case, the liquid crystal display unit has the same plan configuration as the liquid crystal display unit 20 according to the above embodiment that is shown in FIG. 2. Therefore, FIG. 2 will also be used in the following description. That is, the liquid crystal display unit according to this modification has a plurality of pixels 20c that are arranged in matrix form (in a plan view).

Figure 17:
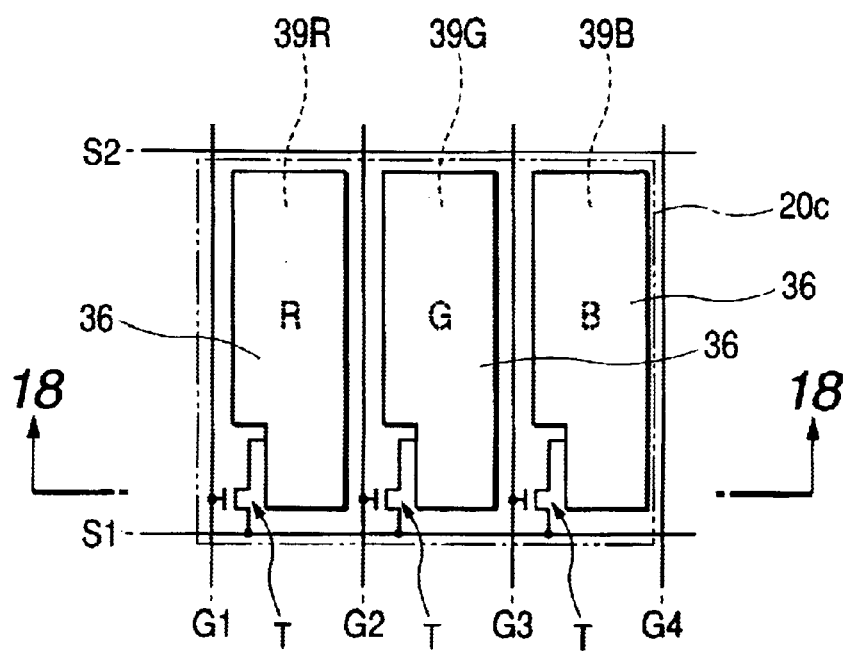
FIG. 17 is an enlarged plan view showing the structure of a pixel of an active matrix liquid crystal display unit.
Figure 18:
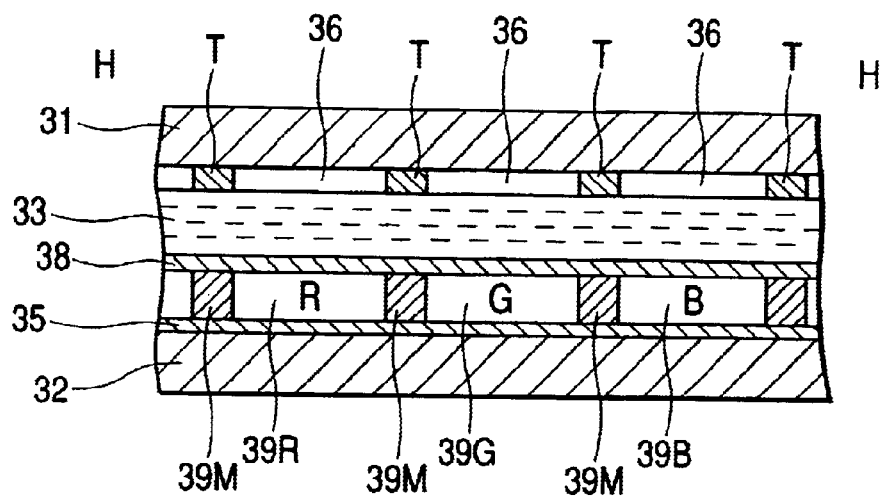
FIG. 18 is a sectional view taken along line 18—18 in FIG. 17.

FIG. 17 is a plan view showing the structure of a pixel 20c of the liquid crystal display unit according to this modification. FIG. 18 is a sectional view taken along line 18—18 in FIG. 17. In the liquid crystal display unit shown in FIGS. 17 and 18, a liquid crystal layer 33 is held between a top substrate 31 and a bottom substrate 32 that are opposed to each other. The inner surface of the top substrate 31 is provided with a plurality of generally rectangular transparent electrodes 36 that are arranged in matrix form (in a plan view) and transistor elements T for pixel switching that are provided for the respective transparent electrodes 36. The inner surface of the bottom substrate 32 is provided with a reflection layer 35, a color filter layer 39 that is formed on the reflection layer 35, and a transparent electrode 38 that is formed over the entire surface of the color filter layer 39. An area where three transparent electrodes corresponding to R, G, and B are formed corresponds to one pixel 20c. In FIG. 17, to make it easier to recognize, the transistor elements T are represented by equivalent circuit symbols.

One end of each transistor element T for switching the associated transparent electrode 36 is connected to the transparent electrode 36, and the other two ends of the transistor element T is connected to one of scanning lines G1 to G3 that are provided between the transparent electrodes 36 and extend in the right-left direction in FIG. 17 and a signal line S1 that extends in the top-bottom direction in FIG. 17. Color filters 39R, 39G, and 39B are provided in the color filter layer 39 on the bottom substrate 32 at positions corresponding to the respective electrodes 36. A black matrix 39M is formed between adjacent ones of the color filters 39R, 39G, and 39B so as to assume a grid form (in a plan view). Although not shown in FIG. 18, a black matrix is formed in grid form (in a plan view) on the inner surface of the top substrate 31 so as to surround the transparent electrodes 36, to prevent light coming from above from shining on the transistor elements T and the scanning lines and the signal lines that are connected to the transistor elements T.

The reflection layer 35 of the liquid crystal display unit of this modification may be any of the reflection layers according to the above embodiment and modifications.

The liquid crystal display unit having the above structure performs display by controlling the light transmission states of the liquid crystal layer 33 between the transparent electrode 36 and the transparent electrode 38 on the bottom substrate 32 by controlling the potentials of the transparent electrode 36 with the transistor elements T.

The active matrix liquid crystal display unit has a tendency that the periodic pattern of the pixels 20c is seen more clearly than in the passive matrix liquid crystal display unit, because the light-interruptive black matrix (BM) is formed in grid form (in a plan view) so as to surround the transparent electrodes 36 and the display contrast can be increased. That is, optical interference tends to occur between the periodic arrangement of the pixels 20c and the prism grooves 14 of the front light 10. However, in the liquid crystal display device according to this modification, the prism grooves 14 extend in the direction that crosses the arrangement direction of the pixels 20c. Therefore, the above interference is suppressed and the reduction in legibility due to a moiré pattern can be prevented effectively. That is, also in the case where a liquid crystal display device according to the invention is constructed by using an active matrix liquid crystal display unit, no moiré pattern occurs in the display area and the liquid crystal display device can produce a uniform and bright display and is superior in display quality.

Although in FIG. 18 the color filter layer 39 is formed on the reflection layer 35 side, another structure is possible in which electrodes for pixel switching that also serve as a reflection layer are formed on the bottom substrate 32 side and a color filter layer is formed on the top substrate 31 side.

Second Embodiment

Figure 19:
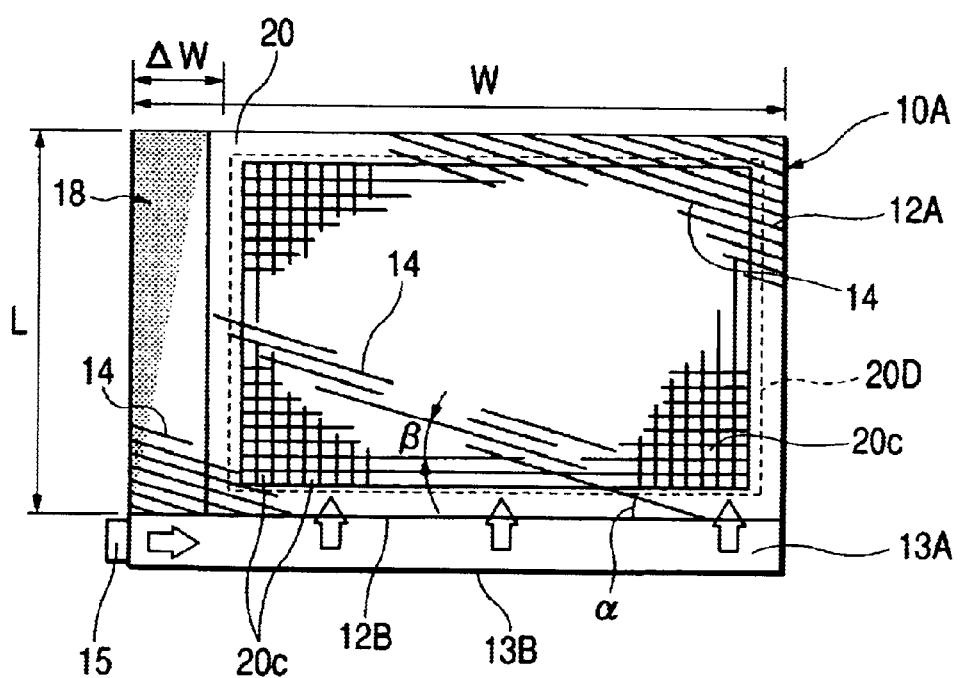
FIG. 19 is a plan view showing the configuration of a liquid crystal display device according to a second embodiment of the invention.

Next, a liquid crystal display device according to a second embodiment of the invention will be described with reference to FIG. 19. FIG. 19 is a plan view showing the configuration of the liquid crystal display device according to this embodiment. The liquid crystal display device of FIG. 19 is composed of a front light 10A and a reflection-type liquid crystal display unit 20 that is disposed on the back side of the front light 10A. The front light 10A is composed of a light guide plate 12A, an intermediate light guide 13A that extends along the side end face (light incident surface) 12B of the light guide plate 12A, and a light-emitting element 15 that is disposed adjacent to the left-hand (in FIG. 19) end face of the intermediate light guide 13A. The liquid crystal display unit 20 is equivalent to that shown in FIGS. 1 and 3. A plurality of pixels 20c are formed in matrix form in a display area 20D of the liquid crystal display unit 20.

As shown in FIG. 19, in the liquid crystal display device according to this embodiment, the light guide 12A of the front light 10A is larger than the display area 20D of the liquid crystal display unit 20 and projects from the liquid crystal display unit 20 to the light-emitting element 15 side (in a plan view). The other part of the configuration of the front light 10A is the same as that of the front light 10 shown in FIG. 2 and hence will not be described below in detail.

As shown in FIG. 19, in the liquid crystal display device according to this embodiment, the length (width) W of the light guide plate 12 in the right-left direction (in FIG. 19) is greater than the length of the display area 20D of the liquid crystal display unit 20 in the extending direction of the intermediate light guide 13A. The light guide plate 12 projects from the display area 20D by an extension width ΔW (see FIG. 19). This structure increases the uniformity of illumination light that is applied to the display area 20D of the liquid crystal display unit 20 and thereby makes it possible to provide a liquid crystal display device that is superior in legibility.

In a front light that is provided with only a single light-emitting element 15 and in which the prism grooves 14 are inclined with respect to the light incident surface 12B, the exit light quantity tends to be small in a side end portion of the light guide plate 12 on the light-emitting element 15 side. A triangular (in a plan view) dark portion 18 may be formed as shown in FIG. 19. To solve this problem, in the front light 10A according to this embodiment, the dark portion (i.e., a portion in which the exit light quantity is smaller than in the neighboring portion) 18 that may occur in the light guide plate 12A on the side of the light-emitting element 15 is prevented from overlapping with the display area 20D of the liquid crystal display unit 20. As a result, only an area of the light guide plate 12A where illumination light is uniform is used for display, whereby a uniform and bright display can be obtained.

The dark portion 18 in the single-light front light 10A shown in FIG. 19 extends along the side end portion of the light guide plate 12A and assumes a triangular shape that is narrow on the side of the intermediate light guide 13A and becomes wider toward the end face of the light guide plate 12A that is opposite to the intermediate light guide 13A. Therefore, to prevent the dark portion 18 from overlapping with the display area 20D of the liquid crystal display unit 20, it is preferable that the extension width ΔW of the light guide plate 12A be greater than the width of the dark portion 18 at least in the top end portion (in FIG. 19) of the light guide plate 12A where the dark portion 18 is widest. However, from the viewpoints of the miniaturization and the manufacturing cost of the liquid crystal display device, it is preferable that the extension width ΔW of the light guide plate 12A of the front light 10A be as small as possible. It is preferable that the lower limit of the extension width ΔW of the light guide plate 12A according to the invention be L×tan α, where α is the inclination angle of the prism grooves 14 of the light guide plate 12A and L is the length of the light guide plate 12A.

The width of the dark portion 18 has a positive correlation with the inclination angle α of the prism grooves 14 of the light guide plate 12A; that is, the dark portion 18 becomes wider as the inclination angle α increases. This is because light traveling inside the light guide plate 12A tends to travel in the direction perpendicular to the prism grooves 14. Therefore, it is considered that the width of the dark portion 18 is almost equal to a value that is given by the formula L×tan α which involves the inclination angle α of the prism grooves 14 and the length L of the light guide plate 12A in the top-bottom direction in FIG. 19 (i.e., the light guiding direction). By setting the extension width ΔW of the light guide plate 12A at least greater than L×tan α, the dark portion 18 is located outside the display area 20D of the liquid crystal display unit 20 and hence only an area where illumination light of the light guide plate 12A is uniform can be used for display.

Third Embodiment

Next, a front light shown in FIG. 20 will be described as an illumination device according to a third embodiment of the invention.

Figure 20:
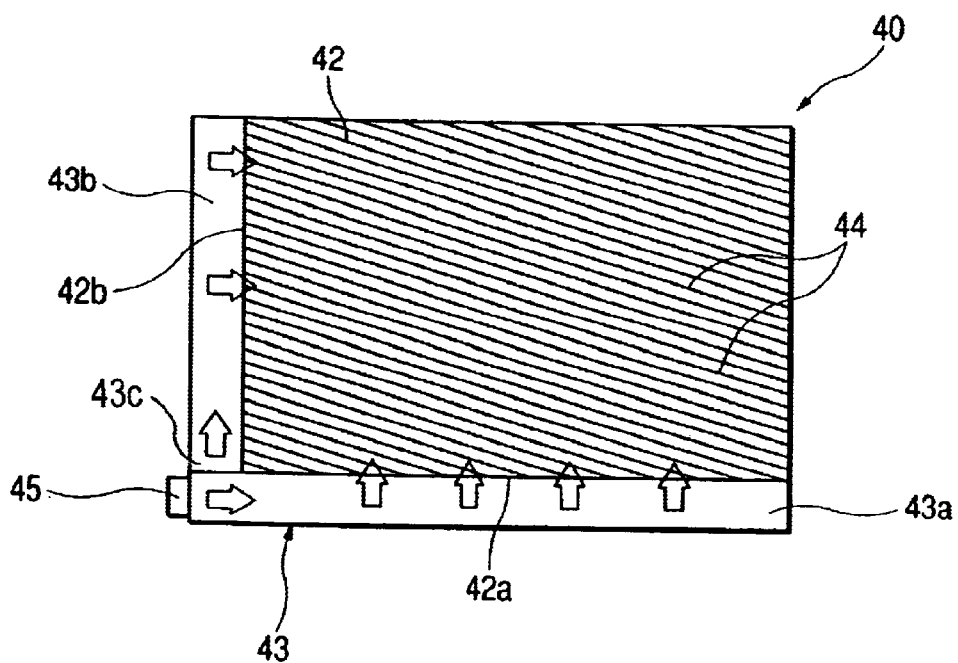
FIG. 20 is a plan view showing the configuration of a front light according to a third embodiment of the invention.

FIG. 20 is a plan view showing the configuration of the front light as the illumination device according to the third embodiment of the invention. The front light 40 of FIG. 20 is composed of a light guide plate 42, an L-shaped (in a plan view) intermediate light guide 43 that extends along two side end faces of the light guide plate 42, and a light-emitting element 45 that is disposed adjacent to one end face of the intermediate light guide 43.

The light guide plate 42 is almost equivalent to the light guide plate 12 according to the first embodiment that is shown in FIGS. 1–3 and hence generally assumes a flat plate shape. One major surface of the light guide plate 42 is formed with a plurality of prism grooves 44 that are parallel with each other (in a plan view), and the other major surface is a flat surface. Light that is introduced through side end faces 42a and 42b of the light guide plate 42 is reflected by the prism grooves 44, whereby illumination light is output from the light guide plate 42. Inclined from the side end face 42a of the light guide plate 42, the prism grooves 44 not only cause light that is emitted from the single light-emitting element 45 to travel uniformly in a plane parallel with the major surfaces of the light guide plate 42 but also prevent optical interference with an object to be illuminated (e.g., a liquid crystal display unit). It is preferable that the inclination angle of the prism grooves 44 be set in the same manner as the inclination angle α of the prism grooves 14 according to the first embodiment is set.

The intermediate light guide 43 is configured in such a manner that rod-shaped light guide members 43a and 43b are arranged so as to assume an L shape. The light-emitting element 45 is disposed adjacent to that end face of the light guide member 43a which is located on the side where it is connected to the light guide member 43b. The light guide members 43a and 43b extend along the respective side end portions 42a and 42b of the light guide plate 42. Although not shown in FIG. 20, those side faces of the light guide members 43a and 43b which are opposite to their side faces that are opposed to the light guide plate 42 are each formed with a plurality of wedge-shaped (in a plan view) grooves that are the same as formed in the intermediate light conductor 13 shown in FIG. 4. If necessary, reflection films may be formed on the faces that are formed with those grooves.

In the thus-configured front light 40 according to this embodiment, most of light that is emitted from the light-emitting element 45 travels inside the light guide member 43a adjacent to which the light-emitting element 45 is disposed and is introduced into the light guide plate 42 through its side end face 42a. Part of the light that has entered the light guide member 43a is introduced into the light guide member 43b through its proximal end face 43c and then introduced into the light guide plate 42 through its side end face 42b. In the thus-configured front light 40 according to this embodiment, light can be introduced, through the light guide member 43b that is perpendicular to the light guide member 43a, into the side end portion on the light-emitting element 45 side where the exit light quantity might otherwise be small because of the single-light nature of the front light 40. Therefore, the front light 40 can make the exit light quantity uniform over the entire light exit surface of the light guide plate 42 though it is of a single-light type.

Fourth Embodiment

Next, a front light shown in FIG. 21 will be described as an illumination device according to a fourth embodiment of the invention.

Figure 21:
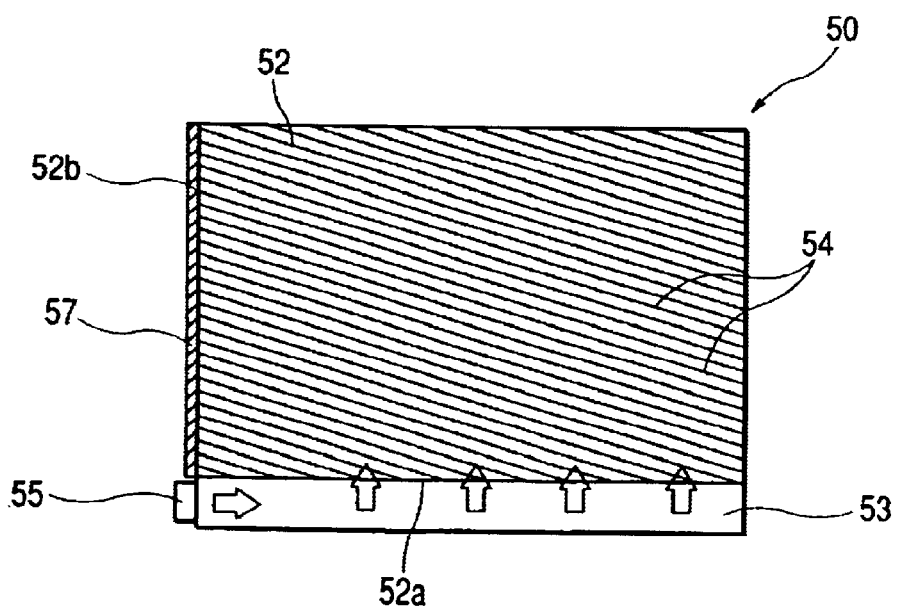
FIG. 21 is a plan view showing the configuration of a front light according to a fourth embodiment of the invention.

FIG. 21 is a plan view showing the configuration of the front light according to the fourth embodiment of the invention. The front light 50 of FIG. 21 is composed of a light guide plate 52, a rod-shaped intermediate light guide 53 that extends along a side end face 52a of the light guide plate 52, and a light-emitting element 55 that is disposed adjacent to one end face of the intermediate light guide 53. In the front light 50 according to this embodiment, a reflection film 57 that is a high-reflectance metal thin film of Al, Ag, or the like is formed on a side end face 52b of the light guide plate 52 on the light-emitting element 55 side.

The light guide plate 52 is almost equivalent to the light guide plate 12 according to the first embodiment that is shown in FIGS. 1–3 and hence generally assumes a flat plate shape. One major surface of the light guide plate 52 is formed with a plurality of prism grooves 54 that are parallel with each other (in a plan view), and the other major surface is a flat surface. Light that is introduced through the side end face 52a of the light guide plate 52 through the intermediate light guide 53 is reflected by the prism grooves 54, whereby illumination light is output from the light guide plate 52. Inclined from the side end face 52a of the light guide plate 52, the prism grooves 54 not only cause light that is emitted from the single light-emitting element 55 to travel uniformly in a plane parallel with the major surfaces of the light guide plate 52 but also prevent optical interference with an object to be illuminated (e.g., a liquid crystal display unit). It is preferable that the inclination angle of the prism grooves 54 with respect to the light incident surface 52a be set in the same manner as the inclination angle α of the prism grooves 14 according to the first embodiment is set.

The intermediate light guide 53 and the light-emitting element 55 according to this embodiment can have the same structures as the intermediate light guide 13 and the light-emitting element 15 according to the first embodiment, and hence they will not be described here in detail.

In the thus-configured front light 50 according to this embodiment, the reflection film 57 is formed on the side end face 52b that is adjacent to the side end portion on the light-emitting element 55 side where the exit light quantity might otherwise be small because of the single-light nature of the front light 50. Therefore, light traveling inside the light guide plate 52 does not leak through the side end face 52b. Further, light reflected by the reflection film 57 is used as illumination light and the luminance can be increased as much in the portion where the exit light quantity would otherwise be small. As a result, the front light 50 can make the exit light quantity uniform over the entire light exit surface of the light guide plate 52 though it is of a single-light type.

Fifth Embodiment

Next, a front light shown in FIG. 22 will be described as an illumination device according to a fifth embodiment of the invention.

Figure 22:
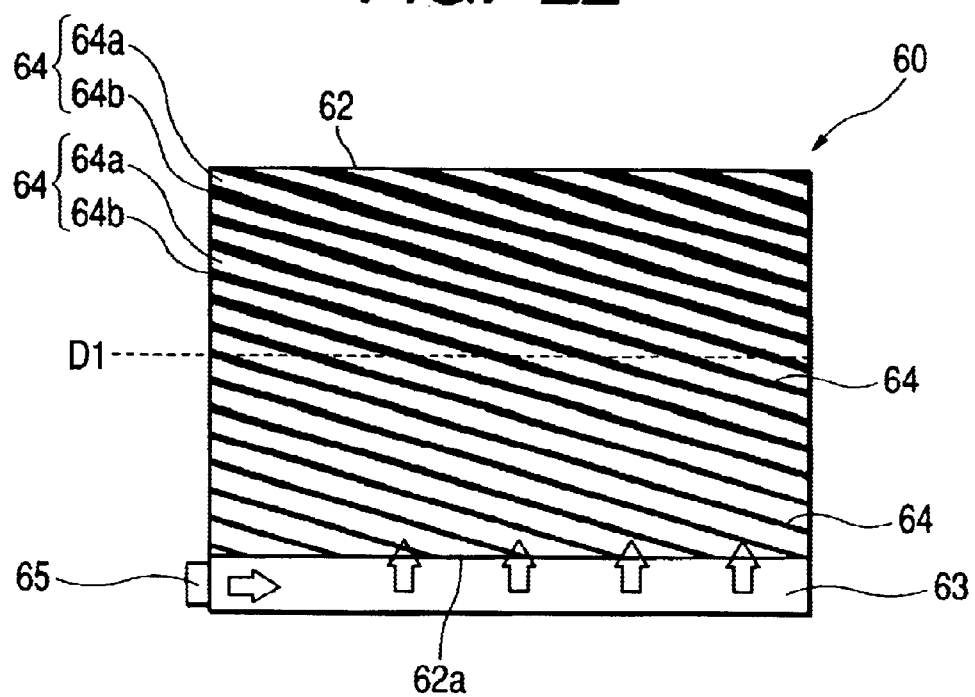
FIG. 22 is a plan view showing the configuration of a front light according to a fifth embodiment of the invention.
Figure 23A:
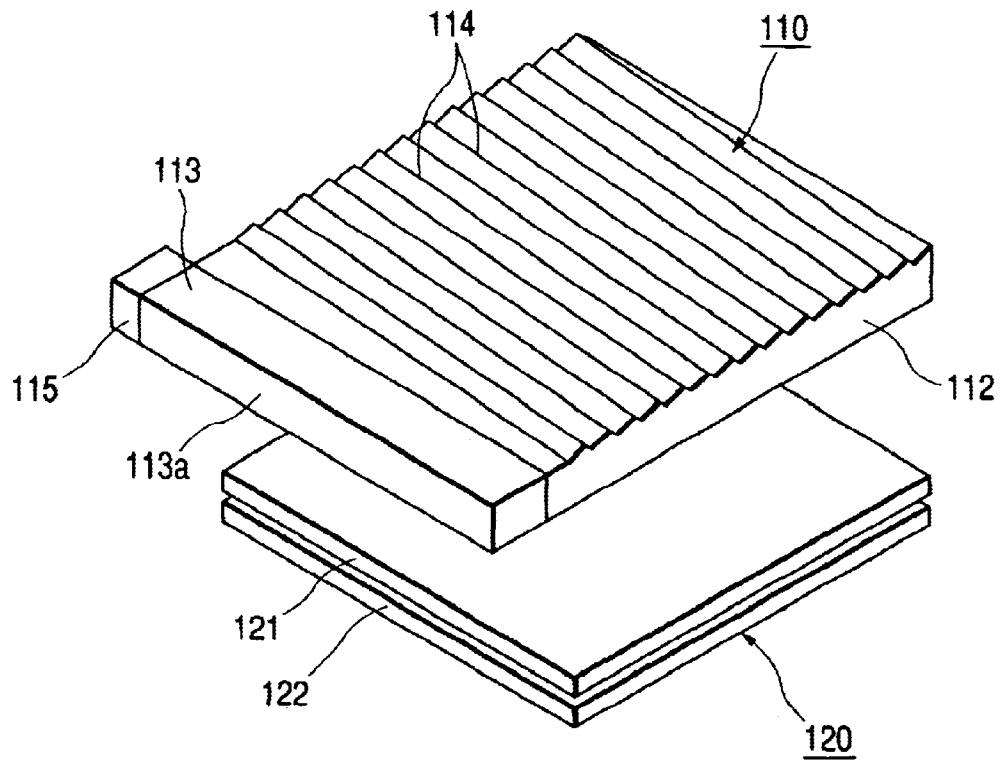
FIG. 23A is a perspective view of a conventional liquid crystal display device.
Figure 23B:
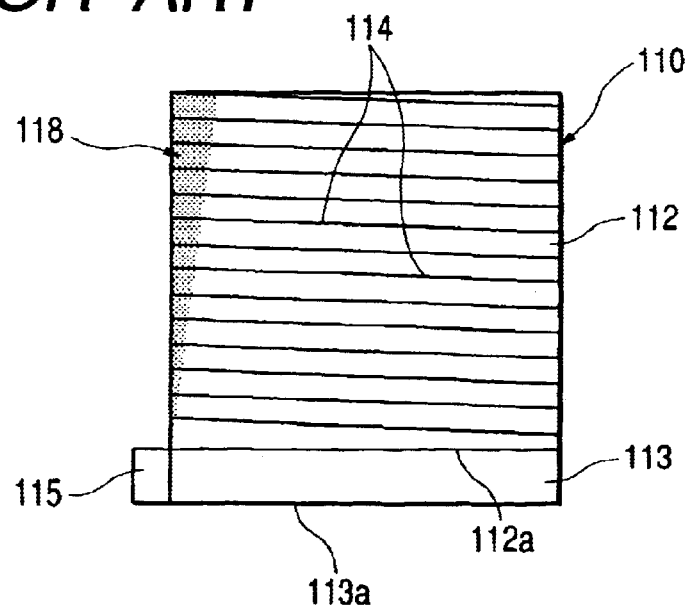
FIG. 23B is a plan view of a front light shown in FIG. 23A.

FIG. 22 is a plan view showing the configuration of the front light according to the fifth embodiment of the invention. The front light 60 of FIG. 21 is composed of a light guide plate 62, a rod-shaped intermediate light guide 63 that extends along a side end face (light incident surface) 62a of the light guide plate 62, and a light-emitting element 65 that is disposed adjacent to one end face of the intermediate light guide 63. In the front light 60 according to this embodiment, the width of the steep slope 64b of the prism groove 64 formed in the reflecting surface increases as the position goes away from the light incident surface 62a of the light guide plate 62.

The light guide plate 62 is almost equivalent to the light guide plate 12 according to the first embodiment that is shown in FIGS. 1–3 and hence generally assumes a flat plate shape. One major surface of the light guide plate 62 is formed with a plurality of prism grooves 64 that are parallel with each other (in a plan view), and the other major surface is a flat surface. Light that is introduced through the side end face (light incident surface) 62a of the light guide plate 62 through the intermediate light guide 63 is reflected by the prism grooves 64, whereby illumination light is output from the light guide plate 62. Since the extending direction of the prism grooves 64 is inclined from the side end face 62a of the light guide plate 62, the prism grooves 64 not only cause light that is emitted from the single light-emitting element 65 to travel uniformly in a plane parallel with the major surfaces of the light guide plate 64 but also prevent optical interference with an object to be illuminated (e.g., a liquid crystal display unit). It is preferable that the inclination angle of the prism grooves 64 with respect to the light incident surface 62a be set in the same manner as the inclination angle α of the prism grooves 14 according to the first embodiment is set.

The intermediate light guide 63 and the light-emitting element 65 according to this embodiment can have the same structures as the intermediate light guide 13 and the light-emitting element 15 according to the first embodiment, and hence they will not be described here in detail.

Each of the prism grooves 64 that are formed in the light guide plate 62 according to this embodiment consists of a slight slope 64a and a steep slope 64b that is steeper than the slight slope 64a. The slight slope 64a and the steep slope 64b assume a wedge shape (in cross-section). In each prism groove 64, the steep slope 64b is located closer to the light incident surface 62a of the light guide plate 62 than the slight slope 64a is. The inclination angles of the slight slope 64a and the steep slope 64b are in the same ranges as those of the slight slope 14a and the steep slope 14b according to the first embodiment.

In the front light 60 according to this embodiment, as shown in FIG. 22, the prism grooves 64 are formed in stripe form at a constant pitch but the ratio between the widths of the slight slope 64a and the steep slope 64b of the prism groove 64 varies continuously in the reflecting surface. More specifically, the prism grooves 64 are formed in such a manner that in the extending direction of each prism groove 64 which is inclined from the light incident surface 62a of the light guide plate 62 the width of the steep slope 64b increases (i.e., the width of the slight slope 64a decreases) continuously as the position goes away from the light incident surface 62a. Having such a structure, the front light 60 according to this embodiment increases the proportion of light that is reflected by the steep slope 64b to go down is increased as the position goes away from the light incident surface 62a and thereby makes it possible to uniformize the exit light quantity in the light exit surface of the light guide plate 62.

In the front light 60 according to this embodiment, the prism grooves 64 are formed in such a manner that widths of the steep slopes 64b of a plurality of prism grooves 64 at positions having the same distance from the light incident surface 62a are identical. That is, widths of steep slopes 64b prism grooves 64 at positions where the prism grooves intersect a straight line D1 (see FIG. 22) are identical. This structure makes it possible to suppress a variation in an exit light quantity profile in the right-left direction (in FIG. 22).

EXAMPLES

The invention will be described below in more detail by using examples. It is noted that the following examples are not intended to restrict the scope of the invention.

First Example

In this example, front lights having the configuration of FIGS. 1–3 were produced in which the ratio between the width of the steep slope 14b at the position closest to the light incident surface 12a and that at the position farthest from the light incident surface 12a were varied and luminance distributions in the light exit surface of the light guide plate 12 were measured.

An intermediate light guide and a light guide plate were produced by injection-molding a resin material. An acrylic resin was used as a material of the intermediate light guide and was shaped into a quadratic prism of 36.3 mm×3.0 mm×1.0 mm. A lot of V-shaped grooves having an angle of 110° were formed at a pitch of 0.24 μm in one side face of the quadratic prism. The depth of the groove was set smaller as it comes closer to the end face of the intermediate light guide adjacent which a light-emitting element was to be disposed. More specifically, the depth of the groove was increased gradually from 12 μm to 71 μm as it goes away from the light-emitting element side. A 200-nm-thick Ag thin film as a reflection film was formed on the side face of the intermediate light guide that is formed with the V-shaped grooves. Then, an LED was disposed adjacent to one end face of the resulting intermediate light guide. The LED was NSCW215T (trade name) of Nichia Corp.

A light guide plate having the structure of FIG. 1 was produced that measures 36.3 mm (width)×50.2 mm (length)×1.0 mm (thickness) and in which a plurality of prism grooves were formed in one major surface. ARTON (trade name) of JSR Corp. was used as a molding material. The angle (inclination angle α) between the extending direction of prism grooves and the side end face adjacent to which the intermediate light guide was to be disposed was set at 0° and the pitch of prism grooves was set at 0.16 mm. Five kinds of light guide plates were produced in which the inclination angles of the steep slope and the slight slope of each prism groove were fixed at 43° and 2.30°, respectively, and the ratio of the width of the steep slope at the position closest to the light incident surface 12a and that at the position farthest from the light incident surface 12a was varied as shown in Table 1. More specifically, in the case of a light guide plate No. 1-3, for example, shown in Table 1, the width of the steep slope at the position closest to the light incident surface 12a was 7.91 μm and that at the position farthest from the light incident surface 12a was 10.29 μm. The widths of steep slopes located between the above two positions were set on a proportional basis, that is, in proportion to the distance from the light incident surface 12a. In the other kinds of light guide plates, the width of the steep slope at the position closest to the light incident surface 12a was the same as that of the light guide plate No. 1-3 and the widths of the other steep slopes of prism grooves were set differently according to steep slope width ratios shown in Table 1.

Front lights of this example were obtained by disposing the rod-shaped intermediate light guide adjacent to the side end face of each of the light guide plates thus produced.

Then, each front light thus produced was turned on and a luminance distribution was measured. Luminance measurement positions were common to the light guide plates. Referring to FIG. 2, the light guide plate 12 was divided into three regions in the top-bottom directions (in FIG. 2) and the centers of the respective regions were employed as measurement points. Therefore, measurement point-2 in Table 1 is the center of the light guide plate 12, measurement point-1 is separated upward (in FIG. 2) from measurement point-2 by about 12.5 mm, and measurement point-3 is separated downward (in FIG. 2) from measurement point-2 by about 12.5 mm.

A result of the luminance measurement is shown in Table 1. As shown in Table 1, the luminance differences between the measurement points fall within 22% in the front lights whose steep slope width ratio is 1.0:1.1 to 1.0:1.5. In these front lights, the luminance distribution is regarded as uniform from a practical viewpoint.

For front lights of a reflection-type liquid crystal display device, the upper limit of a luminance difference range that is appropriate for practical use is about 25%. If a luminance difference greater than this value occurs in the light exit surface of the light guide plate 12, the visibility lowers markedly at a position where the luminance is too high (or low). Therefore, in the case of the front light No. 1—1 whose steep slope width ratio is 1:1, the luminance at measurement point-1 is clearly insufficient. There is a tendency that the luminance at measurement point-1 incident surface be larger than 0° and smaller than or equal to 15°. It is even more preferable that the inclination angle α of the prism grooves be in a range of 6.5° to 8.5°.

TABLE 1

| No. | 1-1 | 1-2 | 1-3 | 1-4 | 1-5 |
| --- | --- | --- | --- | --- | --- |
| Steep slope width ratio | 1.0:1.0 | 1.0:1.1 | 1.0:1.2 | 1.0:1.3 | 1.0:1.5 |
| Measurement point-1 | 67.6 | 78 | 88.4 | 99.7 | 120 |
| Measurement point-2 | 83.7 | 88.5 | 93.3 | 97 | 111 |
| Measurement point-3 | 100 | 100 | 100 | 100 | 100 |

Unit: %

Second Example

Next, to clarify an appropriate range of the inclination angle of the steep slopes of the prism grooves that are formed in the reflecting surface of the light guide plate, seven kinds of light guide plates in which the slight slopes and the steep slopes of prism grooves have inclination angles θ1 and θ2 shown in Table 2 were produced. Corresponding front lights were constructed and their average luminance values were measured. The front lights of this example were produced by basically the same process as those of the first example. In the front lights of this example, the steep slope width ratio was fixed at 1.0:1.3 and the inclination angle θ1 of the slight slopes of the prism grooves was fixed at 2.3°.

Table 2 shows a result of the measurement of average luminance values. As shown in Table 2, the average luminance is larger than about 15 cd/cm$^2$ when the inclination angle of the steep slopes is in a range of 41° to 45°. And the average luminance tends to be low when the inclination angle of the steep slopes is out of this range. Therefore, it has been found that to maximize the efficiency of utilization of the light source (light-emitting element) and form a high-luminance front light the inclination angle of the steep slopes should be in the range of 41° to 45°.

TABLE 2

| No. | θ1 | θ2 | Pitch P1 | Average luminance |
| --- | --- | --- | --- | --- |
| 2-1 | 2.3 | 40 | 0.16 | 13.7 |
| 2-2 | 2.3 | 41 | 0.16 | 14.8 |
| 2-3 | 2.3 | 42 | 0.16 | 15.9 |
| 2-4 | 2.3 | 43 | 0.16 | 16.9 |
| 2-5 | 2.3 | 44 | 0.16 | 15.2 |
| 2-6 | 2.3 | 45 | 0.16 | 14.5 |
| 2-7 | 2.3 | 46 | 0.16 | 13 |

Third Example

In this example, a liquid crystal display device was constructed by producing a front light having the configuration of FIGS. 1–3 and disposing it in front of a liquid crystal display unit. It was checked whether the configuration according to the invention was not prone to cause a moiré pattern and could produce a display having a uniform brightness distribution.

First, an intermediate light guide and a light guide plate were produced by injection-molding a resin material. An acrylic resin was used as a material of the intermediate light guide and was shaped into a quadratic prism of 73.5 mm×4.8 mm×1.0 mm. A lot of V-shaped grooves having an angle of 110° were formed at a pitch of 0.24 μm in one side face of the quadratic prism. The depth of the groove was set smaller as it comes closer to the end face of the intermediate light guide adjacent which a light-emitting element was to be disposed. More specifically, the depth of the groove was increased gradually from 12 μm to 71 μm as it goes away from the light-emitting element side. A 200-nm-thick Ag thin film as a reflection film was formed on the side face of the intermediate light guide that is formed with the V-shaped grooves.

Then, an LED was disposed adjacent to one end face of the resulting intermediate light guide. The LED was NSCW215T (trade name) of Nichia Corp.

A light guide plate having the structure of FIG. 1 was produced that measures 73.5 mm (width)×50 mm (length)×1.0 mm (thickness) and in which a plurality of prism grooves were formed in one major surface. ARTON (trade name) of JSR Corp. was used as a molding material. Light guide plates were produced in which the prism groove pitch was varied as shown in Table 3. In this example, the pixel arrangement direction of a liquid crystal display unit (described later) to be combined with the light guide plate was approximately parallel with the side end face of the light guide plate. Therefore, the inclination angle α is equal to the angle (inclination angle β) formed by the prism groove extending direction and the pixel arrangement direction of the liquid crystal display unit.

In these light guide plates, the inclination angles of the steep slope and the slight slope of each prism groove were fixed at 43° and 2.3°, respectively.

Then, front lights were constructed by disposing the rod-shaped intermediate light guide adjacent to the side end face of each of the light guide plates thus produced.

Then, liquid crystal display devices were constructed by disposing each of the thus-produced front lights adjacent to a liquid crystal display unit. The liquid crystal display devices were put into operation, and a moiré pattern and a dark portion to appear in a light-emitting-element-side portion of the light guide plate were observed visually. For a dark portion in the light guide plate, its width in the width direction (right-left direction in FIG. 2) of the light guide plate was measured. Evaluation results are shown in Table 3.

The liquid crystal display unit was an active matrix color liquid crystal display unit having a pixel pitch of 0.255 mm in which the arrangement of color filters was of a vertical stripe type as shown in FIG. 6.

As shown in Table 3, satisfactory results were obtained in samples in which the prism groove inclination angle α is 7.5° and the prism groove pitch is greater than 0.12 mm and smaller than 0.2 mm (i.e., sample Nos. 3-2 to 3-4). It has been found that for the liquid crystal display unit pixel pitch of 0.255 mm the prism groove pitch should be greater than ½ times the pixel pitch and smaller than ¾ times the pixel pitch.

TABLE 3

| Sample No. | Inclination angle α (°) | Prism groove pitch P1 (mm) | Pixel pitch P0 (mm) | P1/P0 | Moiré |
| --- | --- | --- | --- | --- | --- |
| 3-1 | 7.5 | 0.12 | 0.255 | 0.471 | Present |
| 3-2 | 7.5 | 0.16 | 0.255 | 0.627 | Absent |
| 3-3 | 7.5 | 0.18 | 0.255 | 0.706 | Absent |
| 3-4 | 7.5 | 0.19 | 0.255 | 0.745 | Almost absent |
| 3-5 | 7.5 | 0.255 | 0.255 | 1 | Present |

As described above, the illumination device according to the invention comprises a light source, and a light guide plate for receiving light emitted from the light source through one side end face thereof as a light incident surface, and for outputting the light traveling inside the light guide plate through one major surface thereof, the other major surface, being a light reflecting surface, of the light guide plate being formed, in stripe form in a plan view, with a plurality of prism grooves each of which is formed by a slight slope and a steep slope having an inclination angle larger than that of the slight slope, the inclination angles of the slight slope and the steep slope being in ranges of 1° to 10° and 41° to 45°, respectively, the width of the steep slope in the reflecting surface increasing as the steep slope goes away from the light incident surface in such a manner that the width of the steep slope amounts to 1.1 to 1.5 at a position farthest from the light incident surface if it is assumed that the width of the steep slope is equal to 1.0 at a position closest to the light incident surface. In this manner, the structure of the prism grooves is optimized and the efficiency of utilization of the light source that is provided in the illumination device is increased, whereby high-luminance illumination is enabled and the uniformity of the exit light quantity in the light exit surface of the light guide plate can be increased.

The liquid crystal display device according to the invention comprises the illumination device according to the invention and a liquid crystal display unit that is disposed on the light exit surface side of the light guide plate of the illumination device. This configuration makes it possible to provide superior display quality having high luminance and a uniform brightness distribution. The brightness uniformity is not lowered though the illumination device has only a single light-emitting element. This makes it possible to provide a liquid crystal display device that is superior in display quality and low in power consumption.

What is claimed is:

1. An illumination device comprising:

a light source; and a light guide plate for receiving light emitted from the light source through one side end face thereof as a light incident surface, and for outputting light traveling inside the light guide plate through one major surface thereof, the major surface of the light guide plate being formed in stripe form in a plan view with a plurality of prism grooves each of which is formed by a slight slope and a steep slope having an inclination angle larger than that of the slight slope, the inclination angles of the slight slope and the steep slope being in ranges of 1° to 10° and 41° to 45°, respectively, widths of the steep slopes increasing with increasing position away from the light incident surface such that a ratio of the width of the steep slope at a position farthest from the light incident surface to the width of the steep slope at a position closest to the light incident surface is 1.1 to 1.5.

2. The illumination device according to claim 1, wherein the width of the steep slope of each of the prism grooves is approximately constant in a prism groove extending direction, and wherein the width of the steep slope increases as a prism groove average distance from the light incident surface increases.

3. The illumination device according to claim 1, wherein an extending direction of the prism grooves crosses the light incident surface.

4. The illumination device according to claim 3, wherein the width of the steep slope of each of the prism grooves increases continuously in a prism groove extending direction as the position goes away from the light incident surface.

5. The illumination device according to claim 3, wherein an inclination angle α of the prism grooves that is formed by the extending direction of the prism grooves and a longitudinal direction of the light incident surface is larger than 0° and at most 15°.

6. The illumination device according to claim 4, wherein an inclination angle α of the prism grooves that is formed by the extending direction of the prism grooves and a longitudinal direction of the light incident surface is in a range of 6.5° to 8.5°.

7. The illumination device according to claim 1, wherein the light source comprises an intermediate light guide containing two light guide members that extend along the light incident surface of the light guide plate and a side end face of the light guide plate adjacent to the light incident surface, respectively, and that are arranged so as to assume an L shape in a plan view, and a light-emitting element that is disposed adjacent to an end face of at least one of the two light guide members.

8. The illumination device according to claim 1, wherein the light source comprises an intermediate light guide extending along the light incident surface of the light guide plate and a light-emitting element disposed adjacent to an end face of the intermediate light guide, and wherein a metal reflection film is formed on a side end face of the light guide plate that is adjacent to the light incident surface.

9. The illumination device according to claim 1, wherein the light source comprises an intermediate light guide extending along the light incident surface of the light guide plate and a light-emitting element disposed adjacent to an end face of the intermediate light guide, and wherein the light guide plate projects, in a longitudinal direction of the light incident surface, from a display region of the light guide plate through which an object to be illuminated by the illumination device is to be transmission-displayed.

10. The illumination device according to claim 9, wherein a projection width ΔW of the light guide plate, the inclination angle α of the prism grooves, and a length L of a side end face of the light guide plate adjacent to the light incident surface satisfy a relationship ΔW≧L×tan α.

11. The illumination device according to claim 7, wherein a side face of the one light guide member at the intermediate light guide that is opposite to a side face thereof that is opposed to the light incident surface of the light guide plate is a prism surface that is formed with a plurality of prism-shaped grooves, and a metal reflection film is formed on the prism surface.

12. A liquid crystal display device comprising:

an illumination device comprising:

a light source; and a light guide plate for receiving light emitted from the light source through one side end face thereof as a light incident surface, and for outputting the light traveling inside the light guide plate through one major surface thereof, the other major surface, being a light reflecting surface, of the light guide plate being formed in stripe form in a plan view with a plurality of prism grooves each of which is formed by a slight slope and a steep slope having an inclination angle larger than that of the slight slope, the inclination angles of the slight slope and the steep slope being in ranges of 1° to 10° and 41° to 45°, respectively, widths of the sleep slopes in the reflecting surface increasing with increasing position goes away from the light incident surface such that a ratio of the width of the steep slope at a position farthest from the light incident surface to the width of the steep slope at a position closest to the light incident surface is 1.1 to 1.5; and a liquid crystal display unit that is illuminated by the illumination device.

13. The liquid crystal display device according to claim 12, wherein the illumination device is disposed on a front side of the liquid crystal display unit, and wherein the prism grooves of the light guide plate have a pitch P1 that is in a range of (½)P0<P1(¾)P0, where P0 is a pixel pitch of the liquid crystal display unit.

14. The liquid crystal display device according to claim 3, wherein an extending direction of the prism grooves crosses the light incident surface of the light guide plate, the liquid crystal display unit is disposed on a back side of the illumination device, and an angle β that is formed by the extending direction of the prism grooves and a pixel arrangement direction of the liquid crystal display unit that is parallel with the light incident surface of the light guide plate is larger than 0° and at most 15°.

15. The liquid crystal display device according to claim 14, wherein the angle β is in a range of 6.5° to 8.5°.

16. The liquid crystal display device according to claim 12, wherein the liquid crystal display unit comprises:

a top substrate and a bottom substrate that are opposed to each other;

liquid crystal molecules that have positive dielectric anisotropy and are held between top and bottom substrates; and a reflection layer and color filters that are laid on an inner surface of the bottom substrate, the reflection layer having a reflection characteristic that reflection luminance is approximately constant in a reflection angle range of 10° to 40° with respect to a normal to a display surface of the liquid crystal display unit.

17. The liquid crystal display device according to claim 16, wherein the reflection layer has a reflection characteristic that a reflection luminance curve is approximately symmetrical with respect to a specular reflection angle of incident light.

18. The liquid crystal display device according to claim 16, wherein the reflection layer has a reflection characteristic that a reflection luminance curve is not symmetrical with respect to a specular reflection angle of incident light.

19. The liquid crystal display device according to claim 12, wherein the liquid crystal display unit is an active matrix liquid crystal display unit.

20. The light crystal display device according to claim 12, wherein the liquid crystal display unit is a passive matrix liquid crystal display unit.

* * * * *

UNITED STATES PATENT AND TRADEMARK OFFICE
CERTIFICATE OF CORRECTION

PATENT NO. : 6,734,929 B2
DATED : May 11, 2004
INVENTOR(S) : Takuro Sugiura et al.

It is certified that error appears in the above-identified patent and that said Letters Patent is hereby corrected as shown below:

<u>Column 30,</u>
Line 31, after "widths of the" delete "sleep" and substitute -- steep -- in its place.
Line 44, delete "($\frac{1}{2}$)P0 <P1($\frac{3}{4}$)P0," and substitute -- ($\frac{1}{2}$)P0 < P1 <($\frac{3}{4}$)P0, -- in it place.

Signed and Sealed this

Sixteenth Day of November, 2004

JON W. DUDAS
*Director of the United States Patent and Trademark Office*